US012754618B1

(12) United States Patent
Brocklesby et al.

(10) Patent No.: US 12,754,618 B1
(45) Date of Patent: Oct. 6, 2026

(54) SYSTEM AND METHOD FOR ORCHESTRATING USER INTERACTION ILLUMINATION OF ADAPTIVE CAPACITIVE SENSOR PADS BASED ON A CURRENT USAGE INPUT MODE AT A CAPACITIVE SPLIT CONTACTLESS KEYBOARD

(71) Applicant: Dell Products LP, Round Rock, TX (US)

(72) Inventors: Brandon Joel Brocklesby, Pflugerville, TX (US); Jason Scott Morrison, Chadron, NE (US); Rachid M. Alameh, Crystal Lake, IL (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 19/283,802

(22) Filed: Jul. 29, 2025

(51) Int. Cl.
*G06F 3/02* (2006.01)
*G06F 3/01* (2006.01)
*G06F 3/044* (2006.01)
*H01H 13/83* (2006.01)

(52) U.S. Cl.
CPC ............ *G06F 3/0219* (2013.01); *G06F 3/017* (2013.01); *G06F 3/0446* (2019.05); *H01H 13/83* (2013.01)

(58) Field of Classification Search
CPC ..................................................... G06F 3/0219
USPC .......................................................... 345/168
See application file for complete search history.

(56) References Cited

U.S. PATENT DOCUMENTS

| | | | |
|---|---|---|---|
| 11,817,275 B2 | 11/2023 | Wang et al. | |
| 2007/0199804 A1 | 8/2007 | Joseph et al. | |
| 2009/0073128 A1 | 3/2009 | Marsden | |
| 2011/0102326 A1 | 5/2011 | Casparian et al. | |
| 2012/0228111 A1 | 9/2012 | Peterson et al. | |
| 2014/0062684 A1 | 3/2014 | Casparian et al. | |
| 2014/0097857 A1 | 4/2014 | Hu | |
| 2014/0204519 A1* | 7/2014 | Wu ...................... | G06F 1/1669 361/679.17 |
| 2014/0224633 A1 | 8/2014 | Peterson et al. | |
| 2016/0195955 A1 | 7/2016 | Picciotto et al. | |
| 2018/0217668 A1 | 8/2018 | Ligtenberg et al. | |

(Continued)

FOREIGN PATENT DOCUMENTS

WO 2016/111876 A1 7/2016

*Primary Examiner* — Long D Pham
(74) *Attorney, Agent, or Firm* — Prol Intellectual Property Law, PLLC; H. Kenneth Prol

(57) ABSTRACT

A split keyboard stack structure of an information handling system comprises a keyboard sensing hardware structure including capacitive sensor pads in a capacitive pads layer formed under a sealed input surface of the keyboard sensing hardware structure to detect capacitive changes from user interaction with a removable tactile input layer, and a host microprocessor to execute machine readable code instructions to receive an initial detected change in capacitance associated with the user input in one of a plurality of usage input modes at the capacitive sensor pads, and a host microprocessor to execute machine readable code instructions to orchestrate emission of light, via light emitting diodes situated under the removable tactile input layer to indicate status or guide user inputs as interactive illumination for various user inputs and operation of various usage modes for the keyboard sensing hardware structure.

20 Claims, 8 Drawing Sheets

(56) References Cited

U.S. PATENT DOCUMENTS

| | | | |
|---|---|---|---|
| 2018/0217669 | A1 | 8/2018 | Ligtenberg et al. |
| 2018/0218859 | A1 | 8/2018 | Ligtenberg et al. |
| 2020/0278747 | A1 | 9/2020 | Ligtenberg et al. |
| 2021/0165513 | A1 | 6/2021 | Liu et al. |
| 2021/0407748 | A1 | 12/2021 | Wang et al. |
| 2022/0326777 | A1 | 10/2022 | Ligtenberg et al. |
| 2023/0333658 | A1 | 10/2023 | Ligtenberg et al. |
| 2024/0047156 | A1 | 2/2024 | Lang et al. |
| 2025/0044874 | A1 | 2/2025 | Ligtenberg et al. |
| 2025/0110530 | A1* | 4/2025 | Wen ...................... G06F 1/1616 |

* cited by examiner

SYSTEM AND METHOD FOR ORCHESTRATING USER INTERACTION ILLUMINATION OF ADAPTIVE CAPACITIVE SENSOR PADS BASED ON A CURRENT USAGE INPUT MODE AT A CAPACITIVE SPLIT CONTACTLESS KEYBOARD

FIELD OF THE DISCLOSURE

The present disclosure generally relates to a system and method for detecting human input via a contactless keyboard sensing hardware structure at a keyboard. The present disclosure more specifically relates systems and methods for orchestrating user interaction illumination of plural capacitive pad sensor based on a current user input triggering a usage input mode, including a key press input mode, a touch input mode, or a touchless gesture input mode at the capacitive split contactless keyboard to provide user feedback indicating the user interaction in a current input.

BACKGROUND

As the value and use of information continues to increase, individuals and businesses seek additional ways to process and store information. One option available are information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more workspace productivity applications such as for teleconferencing, word processing, sales systems, business software, gaming applications, or the like. In some embodiments, a user interface via a keyboard or other input/output (I/O) device may be used with an information handling system for access and input commands.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
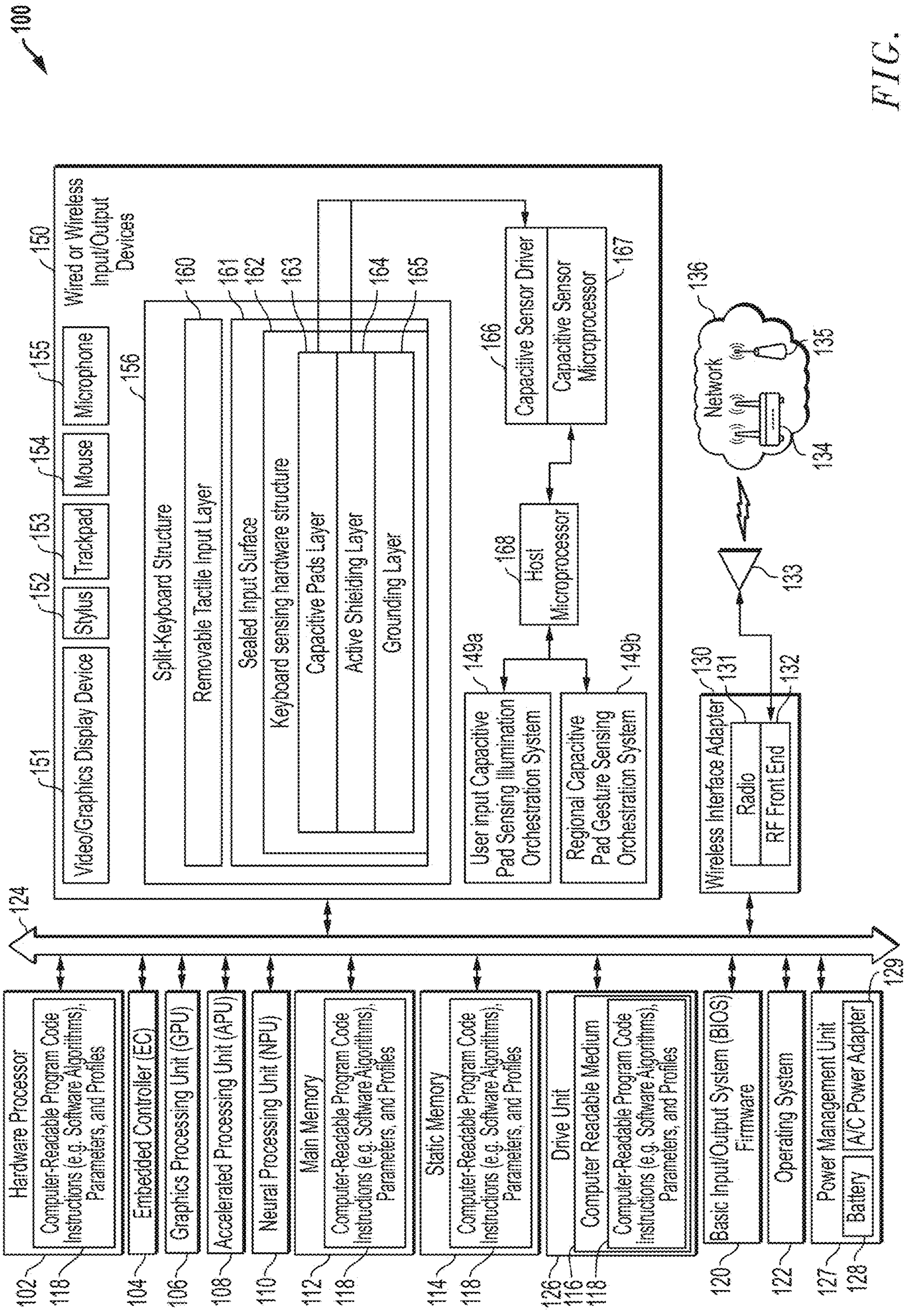
FIG. 1 is a block diagram illustrating an information handling system that includes a split keyboard stack structure having a separate removable tactile input layer and a sealed input surface to receive touch and gesture input from a user contactlessly at capacitive sensor pads and provide user interaction lighting in a keyboard sensing hardware structure formed under the sealed input surface according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may include one or more input/output (I/O) devices for receiving user input and which may include a keyboard, a touchpad, a gesture sensing device such as a camera or infrared camera among other I/O devices. Laptop-type information handling systems include a built-in keyboard. These built-in keyboards are integrated into a base chassis portion or keyboard chassis of the laptop-type information handling system. The present specification describes a keyboard that may be used with a laptop-type information handling system that includes split keyboard stack structure type design with a purely mechanical removable tactile input layer that may include keyboard keys that a user may use to provide input to the laptop-type information handling system. The laptop-type information handling system in the present specification also includes a sealed input surface of a keyboard or base chassis with a keyboard sensing hardware structure formed under the sealed input surface that is separate from the removable tactile input layer. This keyboard sensing hardware structure formed under the sealed input surface may include embedded capacitive sensing technologies, such as a layer array of capacitive sensor pads in a keyboard sensing hardware structure formed under the sealed input surface that detects user inputs such as keystrokes, user touch inputs, or user touchless gesture inputs made on or above the removable tactile input layer in embodiments herein. In an embodiment, the split keyboard structure for the information handling system may include a plurality of capacitive sensor microprocessors to execute machine readable code instructions of capacitive sensor drivers that detect changes in capacitance from user inputs at the removable tactile input layer installed above the sealed input surface. For example, capacitive changes may be detected at the capacitive sensor pads of a keyboard sensing hardware structure formed under the sealed input surface from keypresses of keys for the removable tactile input layer as well as user touch inputs or user touchless gesture inputs at or above the removable tactile input layer in various embodiments.

The information handling system may comprise a hardware processor, a data storage device, and a power management unit (PMU) to provide power to the hardware processor and data storage device. In embodiments herein, the information handling system may include the keyboard sensing hardware structure formed under the sealed input surface, as part of the split keyboard structure. The keyboard sensing hardware structure is operatively coupled to a plurality of capacitive sensor microprocessors as well as a host microprocessor orchestrating input from this plurality of capacitive sensor microprocessors, and the hardware processor of the information handling system to receive one or more types of I/O input from the user and provide user interactive lighting viewable by the user. The split keyboard structure may also include the removable tactile input layer that receives mechanical tactile input from a user, such as keypress of mechanical-only portion of keyboard keys and which also may be used for user touch inputs on the keyboard keys or user touchless gesture inputs above the keyboard keys that may be detected by capacitive sensing pads of the keyboard sensing hardware structure formed under the sealed input surface in embodiments. User interactive illumination may also be viewable through the removable tactile layer installed on the sealed input surface to provide feedback to a user indicating detection or guidance for user touch inputs, user touchless gesture inputs, or status for keypress inputs depending on usage mode operating for capacitive sensor pads of the keyboard sensing hardware structure in embodiments herein.

This removable tactile input layer may be installed over the sealed input surface via interference fit, magnetic interface structures, mechanical latch or other structure such that the removable tactile input layer is detachable and replaceable with a new or different removable tactile input layer, such as a new mechanical-only portion of the split-keyboard structure. Portions of the removable tactile input layer, such as keyboard keys or support surface structure, may be transparent or opaque and transmissive of user interactive illumination from mini-light emitting diodes (LEDs) formed with the keyboard sensing hardware structure formed under the sealed input surface of the keyboard chassis in embodiments herein. Further, the sealed input surface may be transparent or otherwise light transmissive as well in embodiments herein. The keyboard sensing hardware structure formed under sealed input surface may include a capacitive pads layer comprising a plurality of capacitive sensor pads to detect capacitive changes proximate to the sealed input surface. The capacitive sensor pads may be formed of carbon-based conductive deposits on a flexible printed circuit board or on the undersurface of the sealed input surface. Additionally, these capacitive sensor pads formed as carbon-based conductive deposits may be delicate and subject to scratching or damage if exposed to mechanical actuation or moving parts, but which are protected from contact in the keyboard sensing hardware structure formed under the sealed input surface according to embodiments herein.

In an embodiment, the keyboard sensing hardware structure formed under the sealed input surface may also include an active shielding layer which may be operatively coupled to one or more capacitive sensor microprocessors and PMU to be supplied a voltage level to shield the plurality of capacitive sensor pads from a grounding source. In an embodiment, the plurality of capacitive sensor pads of a capacitive pads layer for the keyboard sensing hardware structure may be made of a deposited carbon layer that can detect capacitive changes. The capacitive sensor pads may detect capacitive change levels from actuation of a keyboard key at a first capacitive change level, a touch of a human finger on a keyboard key at a second capacitive change level, and the presence of a human finger or hand over a removable tactile input layer via a third level change in detected capacitance levels at the deposited carbon layers. Each of these capacitance change levels may be associated with a separate usage input mode in embodiments herein, including a key press input mode triggered by detected capacitance change at the first or highest level, a touch input mode triggered by detected capacitance meeting the second or middle level, and a touchless gesture input mode triggered by detected capacitance meeting the third or lowest level. The key press input mode may recognize user physical contact with or actuation of one or more keys of the keyboard via application of downward pressure thereon. A detected capacitance level may be sensed with at least one capacitive pad sensor in the keyboard sensing hardware structure that is above a key press input mode capacitive change threshold value to determine a user key press input mode in an embodiment.

The touch input mode may recognize user physical contact via a user touch input on a removable tactile input layer without such downward pressure, and may be detected across multiple keys or surrounding regions within the removable tactile input layer installed on the sealed input surface of the base chassis of the information handling system. A detected capacitance level may be sensed with at least one capacitive pad sensor in the keyboard sensing hardware structure that is above a touch input mode capacitive change threshold value that is lower than the keypress input mode capacitive change threshold value to determine a user touch input mode is engaged in an embodiment. The touchless gesture input mode may also recognize a user hand or portion thereof gesturing a distance above the removable tactile input layer installed on the sealed input surface of the base chassis of the information handling system, or even above the top surface of the display chassis of the information handling system when the information handling system is placed in a closed configuration. A detected capacitance level may be sensed with at least one capacitive pad sensor in the keyboard sensing hardware structure that is below a touchless gesture input mode capacitive change threshold value that is lower than the touch input mode capacitive change threshold value to determine that a user touchless gesture input mode is engaged in an embodiment. Depending on the usage mode detected, grouping of capacitive sensor pads for group scanning of capacitive change level detection or serially scanning of capacitive sensor pads may be automatically adjusted via a host processor executing machine readable code instructions of a regional capacitive pad gesture sensing orchestration system in embodiments herein. This grouping of capacitive sensor pads may also be used to guide or select user interaction lighting from mini-LEDs co-located with those grouped capacitive sensor pads via execution of machine readable code instructions of user input capacitive pad sensing illumination orchestration system in embodiments herein.

The deposited carbon layers are operatively coupled via a flexible printed circuit board, a printed circuit board, or deposited carbon connector lines among other electrical couplings to the capacitive sensor microprocessor for detecting the one or more capacitive change levels associated with corresponding keyboard key or keys or their locations in one or more of a plurality of different removable tactile input layers, such as a removable tactile input layer keyboard structures, installed on the sealed input surface. The same keyboard sensing hardware structure formed under the sealed input surface may be used with one or more plural removable tactile input layers or keyboard structures installed on the sealed input surface according to embodiments herein.

In an embodiment, each of the plurality of capacitive sensor pads may be operatively coupled to one of a plurality of capacitive sensor microprocessors executing machine readable code instructions of capacitive sensor drivers that can determine when various usage mode capacitive thresholds are reached that may indicate a current usage input mode, including the key press input mode, the touch input mode, and the touchless gesture input mode. In an embodiment, each of the plurality of capacitive sensor pads may be operatively coupled to, for example, the capacitive sensor microprocessors via electrical traces formed on a surface such as a printed circuit board (PCB), a flexible PCB, or via one or more electrical traces deposited under and within the sealed input surface. These electrical sensor traces may be made of deposited silver, carbon, indium tin oxide, copper traces, or other electrical traces. The host microprocessor may execute machine readable code instructions of a regional capacitive pad gesture sensing orchestration system to instruct one or more capacitive sensor microprocessors to simultaneously detect capacitive change across a plurality of operatively coupled capacitive sensor pads forming plural capacitive change sensing regions across a capacitive pads layer and corresponding to regions of a removable tactile input layer installed above a sealed input surface of the keyboard chassis.

Embodiments of the present disclosure include a plurality of capacitive sensor microprocessors, each operatively coupled to and receiving user input from a plurality of capacitive sensor pads within the capacitive pads layer of the split keyboard structure. User input received while in touch input mode may include, for example, a user drawing with a finger across a plurality of individual keys of the keyboard or across a portion of the top surface of a removable tactile input layer installed on a sealed input surface of a base chassis of the information handling system. For example, touch input may be received on a removable tactile input layer situated to either side of a trackpad thereon or even on a sealed input surface without any removable tactile input layer installed in some embodiments. User input received while in touchless gesture input mode may include, for example, a user gesturing with a hand or portion thereof above the surface of the removable tactile input layer when the chassis is in an open position, or above the lid of the chassis of the information handling system is in a closed position.

The host microprocessor executing machine readable code instructions of a user input capacitive pad sensing illumination orchestration system in embodiments herein may provide user interaction illumination as visual feedback for user input received at capacitive sensor pads in the form of light emitting diode (LED) illumination co-located with the keyboard sensing hardware structure formed beneath sealed input surface of the base chassis. For example, the color, intensity level, location or movement direction of illumination from LEDs co-located in the keyboard sensing hardware structure specific to the currently detected usage input mode, which may include the key press input mode, the touch input mode, and the touchless gesture input mode, at the location of detected user input at the removable tactile input layer.

In embodiments herein, a manufacturer may set a key press input mode capacitive change threshold value defining a minimum change in capacitance detectable at a single capacitive pad sensor sufficient to trigger a key press input mode for sensing user keypress input via downward force on a key of the removable tactile input layer for operation at a capacitive sensing microprocessor executing machine readable code instructions for a capacitive sensor driver as coordinated by a regional capacitive pad gesture sensing orchestration system or a user input capacitive pad sensing illumination orchestration system executing on a host microprocessor. A manufacturer may also set a touch input mode capacitive change threshold range that includes capacitive change values lesser or at a lower capacitance value than the key press input mode capacitive change threshold value (and greater than the touchless gesture input mode capacitive change threshold value discussed below) defining a range of changes in capacitance sufficient to trigger a touch input mode for sensing user touch input across the surface of the removable tactile input layer. This touch input mode capacitive change threshold range is set for operation of a capacitive sensor driver by a capacitive sensor microprocessor as coordinated by a regional capacitive pad gesture sensing orchestration system or a user input capacitive pad sensing illumination orchestration system executing on a host microprocessor. The manufacturer in embodiments may further set a touchless gesture input mode capacitive change threshold value that is less than the touch input mode capacitive change threshold range to define a maximum change in capacitance detectable at a capacitive pad sensor sufficient to trigger a touchless gesture input mode for sensing user input via a hand or finger gesture or movement detected at a distance above the removable tactile input layer. Again, this touchless gesture input mode capacitive change threshold value is set for operation of a capacitive sensor driver by a capacitive sensor microprocessor as coordinated by a regional capacitive pad gesture sensing orchestration system or a user input capacitive pad sensing illumination orchestration system executing on a host microprocessor.

In an embodiment, a host microprocessor executing machine readable code instructions for a user input capacitive pad sensing illumination orchestration system may determine which of the usage input modes have been engaged and may generate an interactive illumination for that engaged usage input mode such as with an associated a color or range of light intensity for each usage input mode. For example, a key press input mode may be associated with a first general lighting (e.g., a first lighting intensity level or color) of the removable tactile input layer, and touch input mode and touchless gesture input modes being associated with a second and third lighting settings respectively (e.g., different lighting intensities or colors to indicate which usage mode is engaged).

The host microprocessor in embodiments herein may execute machine readable code instructions of the user input capacitive pad sensing illumination orchestration system to orchestrate emission of light at the first color or intensity level associated with the key press mode at mini or micro LEDs situated beneath one or more capacitive pad sensor at which capacitive change levels meeting the key press input mode capacitive change threshold value are sensed. This may provide visual user interaction feedback for user key press input in the form of illumination as a user engages the keys of a keyboard for a removable tactile input layer with keypress inputs either at particular keys or across the entire keyboard of the removable tactile input layer in various embodiments. In other embodiments herein in which the current usage input mode is the touch input mode, the host microprocessor may execute machine readable code instructions to orchestrate emission of light at a second color or intensity associated with the touch input mode at micro or mini LEDs situated beneath one or more capacitive sensor pads of the capacitive pads layer to illuminate user touch input or indicate a user touch gesture on a removable tactile input layer, such as across particular keyboard keys, as interactive illumination to provide user feedback illuminating the points along the removable tactile input layer at which user touch input is provided and that it has been detected. In still other embodiments in which the current usage input mode is the touchless gesture input mode, the host microprocessor may execute machine readable code instructions to orchestrate emission of light at a third color or intensity associated with the touchless gesture input mode at mini or micro LEDs situated beneath one or more capacitive sensor pads of the capacitive pads layer as interactive illumination to provide user feedback illuminating the points along the removable tactile input layer at which user touchless gesture input is provided and that it has been detected and differentiated from touch input.

In other aspects of embodiments herein, pre-touch illumination may also be enabled, such as, for example, by a user via a graphical user interface (GUI) of the user input capacitive pad sensing illumination orchestration system executing via a host microprocessor. In pre-touch illumination mode, the host microprocessor operating in the touchless gesture input mode may determine a transition to either the touch input mode or the key press input mode by execution of machine readable code instructions of the user input capacitive pad sensing illumination orchestration system to determine that a user's finger or hand is hovering and may engage with touch or even a keypress. In pre-touch illumination, host processor executing machine readable code instructions of the user input capacitive pad sensing illumination orchestration system may instruct emission of light via the micro or mini LEDs situated within the keyboard sensing hardware structure to indicate a location and that a usage mode transition is to occur prior to the user making contact with a finger or portion of a hand at the removable tactile input layer. For example, the host microprocessor in embodiments may execute machine readable code instructions of the user input capacitive pad sensing illumination orchestration system to set a pre-touch illumination capacitive change threshold value for the touch input mode that is a less than the touch input mode capacitive change threshold range but approaching the same. For example, if the detected capacitive change level increases to within a percentage capacitance change value of the touch input mode capacitive change threshold minimum, such as ten percent for example, the user input capacitive pad sensing illumination orchestration system then triggers illumination of keys or of a location on the removable tactile input layer of the imminent touch prior to the user touching the keys in an embodiment. In this way, the host processor executing machine readable code instructions of the user input capacitive pad sensing illumination orchestration system may provide interaction illumination assisting a user regarding location of touch and status of usage input mode engaged in transition between a hand detection or touchless gesture input mode and a touch input mode or even a keypress input mode in an embodiment.

In embodiments in which the host microprocessor is operating in the pre-touch illumination mode, the host microprocessor may then instruct light emissions of varying colors and intensities from LEDs situated beneath the capacitive sensor pads according to the imminent transition of usage input mode prior to the user making contact with the removable tactile input layer. For example, in embodiments in which the current usage input mode is the touchless gesture input mode, the host microprocessor may execute machine readable code instructions of the user input capacitive pad sensing illumination orchestration system to orchestrate emission of light at varying intensity or color as a capacitive change sensed at one or more capacitive sensor pads is detected at the pre-touch illumination threshold value and approaching the touch input capacitive change threshold value for indicating to a user that user touch contact with the removable tactile input layer is imminent and where that touch may occur. As a more specific example, if the touchless gesture input mode were associated with the color blue or a high intensity light and the touch input mode were associated with the color red or a relatively lower intensity light, the host microprocessor may execute machine readable code instructions of the user input capacitive pad sensing illumination orchestration system to orchestrate emission of light via mini or micro LEDs that moves from the color blue to the color purple when capacitive change levels reach the pre-touch illumination threshold value. Then when the capacitive change levels detected reach the minimum range touch input mode threshold level, the user input capacitive pad sensing illumination orchestration system transitions the mini or micro LEDs to the color red or from a medium intensity light to the relatively lower intensity light. This may provide visual feedback user interactive illumination that the usage input mode is shifting from the touchless gesture input mode to the touch input mode as the user's finger or hand approaches the removable tactile input layer.

Similarly, the reverse sequence may occur or different colors or light intensities may be assigned to a keypress input mode for usage input mode status indication in embodiments herein. Further, the host microprocessor may execute machine readable code instructions of the user input capacitive pad sensing illumination orchestration system may adjust or move display interactive lighting across groupings of capacitive sensor pads in capacitive change detection regions across the capacitive pads layer to indicate location, direction, or detection of touch gestures as input or touchless gestures as inputs through the removable tactile input layer in various embodiments. In further embodiments, the host microprocessor may execute machine readable code instructions of the user input capacitive pad sensing illumination orchestration system may adjust or move displayed interactive lighting levels or colors to indicate transition of an input function, such as volume or brightness selection, to indicate status of the detection of touch gestures as input or touchless gestures as inputs through the removable tactile input layer to execute those functional inputs in software or firmware on the information handling system. In such a way, the host microprocessor may execute machine readable code instructions of the user input capacitive pad sensing illumination orchestration system to adjustably illuminate capacitive sensing pads beneath a removable tactile input layer as user interactive illumination based upon current usage input mode, user preferences, as well as the operation of user touch inputs, user touchless gesture inputs, or even keypress inputs as detected at the capacitive sensing pads of a split keyboard stack structure to provide visual feedback to a user of a current usage input mode and of the received user input in embodiments herein.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 134, a base station transceiver 135, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 112, (volatile (e.g., random-access memory, etc.), or static memory 114, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, a neural processing unit (NPU) 110, an accelerated processing unit (APU) 108, other types of hardware processing devices, or any combination thereof. It is appreciated that the information handling system 100 may include any number of hardware processing devices described herein. Computer readable code instructions stored in main memory 112 (e.g., RAM) may be accessible by hardware processing resources using that main memory 112. Machine readable code instructions stored in non-transitory machine readable storage medium of static memory 114, main memory 112, or drive unit 126 and may be involved in invoking such machine readable code instructions to main memory 112 for execution by a hardware processor according to embodiments herein. Additional components of the information handling system 100 may include one or more storage devices such as static memory 114 or drive unit 126. The information handling system 100 may include or interface with one or more communications ports for communicating with external devices, as well as various wired or wireless input and output (I/O) devices 150, such as a mouse 154, a trackpad 153, a stylus 152, a split-keyboard structure 156, a video/graphics display device 151, a microphone 155, or any combination thereof. Further, various wired or wireless input and output (I/O) devices 150, such as a microphone 155, speaker, a trackpad 153, a stylus 152, a split-keyboard structure 156, a video/graphics display device 151, mouse 154, or any combination thereof may be integrated into the chassis of the information handling system 100 in other embodiments. A split-keyboard structure 156 may be formed with keyboard keys in a removable tactile input layer 160 having one or more keyboard layouts or I/O structure layouts such as a touch surface according to various embodiments of the present disclosure. Portions of an information handling system 100 may themselves be considered information handling systems 100.

Information handling system 100 may include devices or modules that embody one or more of the devices or execute instructions for one or more systems and modules. The information handling system 100 may execute machine readable code instructions (e.g., software algorithms) parameters, and profiles 118 that may operate on servers or systems, remote data centers, or on-box in individual client information handling systems according to various embodiments herein. In some embodiments, it is understood any or all portions of machine readable code instructions (e.g., software algorithms) parameters, and profiles 118 may operate on a plurality of information handling systems 100.

The information handling system 100 may include the hardware processor 102 such as a central processing unit (CPU) or other hardware processing resources (e.g., 104, 106, 108, 110). Any of the hardware processing resources may operate to execute computer readable code instructions that are either firmware or software code, such as those software systems and modules described herein. Moreover, the information handling system 100 may include memory such as main memory 112, static memory 114, and disk drive unit 126 (volatile (e.g., random-access memory, etc.), non-volatile memory (read-only memory, flash memory etc.) or any combination thereof or other memory with non-transitory computer readable medium 116 storing machine readable code instructions (e.g., software algorithms) parameters, and profiles 118 executable by the hardware processor 102 (e.g., central processing unit), NPU 110, APU 108, EC 104, GPU 106, or any other hardware processing device. The information handling system 100 may also include one or more buses 124 operable to transmit communications between the various hardware components such as any combination of various wired or wireless I/O devices 150 as well as between hardware processors 102, an EC 104, the operating system (OS) 122, the basic input/output system (BIOS) 120, the wireless interface adapter 130, or a radio module, among other components described herein. In an embodiment, the hardware processor 102, EC 104, GPU 106, NPU 110, APU 108, and/or others may execute one or more bus drivers in order to transmit this data between the information handling system 100 and the wired or wireless input/output devices 150 described herein. In an embodiment, the information handling system 100 may be in wired or wireless communication with the wired or wireless I/O devices 150 such as a split-keyboard structure 156 of embodiments herein, a mouse 154, video/graphics display device 151, stylus 152, trackpad 153, microphone 155, or speaker among other peripheral devices.

As described herein, the information handling system 100 further includes a video/graphics display device 151. The video/graphics display device 151 in an embodiment may function as a liquid crystal display (LCD), an organic light emitting diode (OLED), a flat panel display, or a solid-state display. It is appreciated that the video/graphics display device 151 may be wired or wireless and may be an external video/graphics display device 151 that allows a user to increase the desktop area by extending the desktop in an embodiment. Additionally, as described herein, the information handling system 100 may include or be operatively coupled to a cursor control device (e.g., a trackpad 153, or gesture or touch screen input), a stylus 152, and/or a split-keyboard structure 156, among others that allows the user to interface with the information handling system 100 via the video/graphics display device 151. Information handling system 100 may also be operatively coupled to a wired or wireless input/output device 150 or other hardware devices that may include a hardware processing device such as a hardware processor, microcontroller, or other hardware processing resource. Various drivers and hardware control device electronics may be operatively coupled to operate the wired or wireless I/O devices 150 according to the embodiments described herein.

A network interface device of the information handling system 100 may be wired or wireless such as shown with wireless interface adapter 130 that can provide wireless connectivity among devices such as with Bluetooth® or to a network 136, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 131, RF front end 132 and antenna 133 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems.

In other embodiments, a WAN, WWAN, LAN, and WLAN may each include an AP 134 or base station 135 used to operatively couple the information handling system 100 to a network 136 via a wireless interface adapter 130. In a specific embodiment, the network 136 may include macro-cellular connections via one or more base stations 135 or a wireless AP 134 (e.g., Wi-Fi), or such as through licensed or unlicensed WWAN small cell base stations 135. Connectivity may be via wired or wireless connection. For example, wireless network wireless APs 134 or base stations 135 may be operatively connected to the information handling system 100. Wireless interface adapter 130 may include one or more Radio Frequency (RF) subsystems (e.g., radio 131) with transmitter/receiver circuitry, modem circuitry, one or more antenna Radio Frequency (RF) front end 132 circuits, one or more wireless controller circuits, amplifiers, antennas 133 and other circuitry of the radio 131 such as one or more antenna ports used for wireless communications via multiple radio access technologies (RATs). The radio 131 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, proprietary RF protocol, or similar wireless standards may be used. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, a hardware processing resource executes machine readable code instructions of software or firmware to implement one or more of some systems and methods described herein, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware devices with related control and data signals that may be communicated between and through the modules, or as portions of an application-specific integrated circuit. Accordingly, the present system encompasses a hardware processing resource executing machine readable code instructions of software or firmware as well as hardware implementations or any combination.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes machine readable code instructions, parameters, and profiles 118 or receives and executes machine readable code instructions, parameters, and profiles 118 responsive to a propagated signal, so that a hardware device connected to a network 136 may communicate voice, video, or data over the network 136. Further, the machine readable code instructions, parameters, and profiles 118 may be transmitted or received over the network 136 via the network interface device or wireless interface adapter 130 in some embodiments.

The information handling system 100 may include a set of machine readable code instructions, parameters, and profiles 118 that may be executed to cause the computer system to perform any one or more of the methods or computer-based functions disclosed herein. For example, machine readable code instructions, parameters, and profiles 118 may be executed by a hardware processor 102, GPU 106, EC 104, APU 108, NPU 110, or any other hardware processing resource and may execute software applications, agents, firmware, or other aspects or components used to execute the methods and systems described herein. Various software modules comprising application machine readable code instructions, parameters, and profiles 118 may be coordinated by an operating system (OS) 122, and/or via an application programming interface (API) include a unified device API described herein. An example OS 122 may include Windows®, Android®, and other OS types. Example APIs may include Win 32, Core Java API, or Android APIs.

In an embodiment, the information handling system 100 may include a disk drive unit 126. The disk drive unit 126 and may include machine-readable program code instructions, parameters, and profiles 118 in which one or more sets of machine-readable program code instructions, parameters, and profiles 118 such as firmware or software can be embedded to be executed by the hardware processor 102 (e.g., CPU) or other hardware processing devices such as a GPU 106, an EC 104, an NPU 110, an APU 108, or other hardware processing resource device to perform the processes described herein. Similarly, main memory 112 and static memory 114 may also contain a non-transitory computer-readable medium for storage of one or more sets of machine-readable program code instructions, parameters, or profiles 118 described herein. The disk drive unit 126 or static memory 114 also contain space for data storage. Further, the machine-readable program code instructions, parameters, and profiles 118 may embody one or more of the methods as described herein. In a particular embodiment, the machine-readable program code instructions, parameters, and profiles 118 may reside completely, or at least partially, within the main memory 112, the static memory 114, and/or within the disk drive 126 during execution by the hardware processor 102, EC 104, APU 108, NPU 100, or GPU 106 of information handling system 100.

Main memory 112 or other memory of the embodiments described herein may contain computer-readable medium (not shown), such as RAM in an example embodiment. An example of main memory 112 includes random access memory (RAM) such as static RAM (SRAM), dynamic RAM (DRAM), non-volatile RAM (NV-RAM), or the like, read only memory (ROM), another type of memory, or a combination thereof. Static memory 114 may contain non-transitory computer-readable medium (not shown), such as NOR or NAND flash memory in some example embodiments. The applications and associated APIs, for example, may be stored in static memory 114 or on the disk drive unit 126 that may include access to a machine-readable code instructions, parameters, and profiles 118 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 127 (a.k.a. a power supply unit (PSU)). The PMU 127 may include a hardware controller and executable machine-readable code instructions to manage the power provided to the components of the information handling system 100 such as the hardware processor 102 and other hardware components described herein. The PMU 127 may control power to one or more components including the one or more drive units 126, the hardware processor 102 (e.g., CPU), the EC 104, the GPU 106, the APU 108, the NPU 110, a video/graphic display device 151, or other wired or wireless I/O devices 150 such as the mouse 154, the stylus 152, the split-keyboard structure 156, microphone 155, and the trackpad 153 and other components that may require power when a power button has been actuated by a user. In an embodiment, the PMU 127 may monitor power levels and power may be electrically coupled to the information handling system 100 via various ports in embodiments herein to provide this power. The PMU 127 may be coupled to the bus 124 to provide or receive data or machine-readable code instructions. The PMU 127 may regulate power from a power source such as the battery 128, or AC power adapter 129 such as from one or more ports. In an embodiment, the battery 128 may be charged via the AC power adapter 129 and provide power to the components of the information handling system 100 when AC power from the AC power adapter 129 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 116 can store information received from distributed network resources such as from a cloud-based environment. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may include a split-keyboard structure 156 used by a user to provide keypress, touch, or touchless gesture input to the information handling system 100 according to various embodiments. In the context of the present specification, the information handling system 100 may be a laptop-type information handling system 100 that includes a base portion and a lid portion. A housing of the lid portion or display chassis, in an embodiment, may house the video/graphics display device 151 described herein. The base portion, also referred to as a base chassis or keyboard chassis, may be where the split-keyboard structure 156 is placed giving the user the ability to provide input to the information handling system 100. The base chassis or keyboard chassis in embodiments may also house one or information handling system hardware components such as those described in accordance with FIG. 1.

The split-keyboard structure 156 may have a split structure that includes a removable tactile input layer 160 installed on a sealed input surface 161 of the base chassis or keyboard chassis, and is independent of a keyboard sensing hardware structure 162 formed under the sealed input surface 161 in embodiments herein. The sealed input surface 161 operates as a sealed, top surface housing for a base chassis or other chassis of information handling system 100. In other embodiments, the sealed input surface 161 may serve as a sealed top surface of a keyboard chassis for an independent keyboard structure. The removable tactile input layer 160 may be that layer that a user interacts with to provide input that is contactlessly detected by the keyboard sensing hardware structure 162 with capacitive sensor pads formed under a sealed input surface 161 of the chassis for the information handling system 100. This removable tactile input layer 160 may include only mechanical elements such as mechanical keyboard keys that provide tactile response to the user when the mechanical keyboard keys or other I/O interface structures such as touch areas are pressed. The removable tactile input layer 160 may not have any associated electronics and a user's finger or movement of mechanical keyboard keys may affect capacitance detected in the keyboard sensing hardware structure 162 formed under a sealed input surface 161 such as with a capacitive pads layer 163 in embodiments herein.

In a specific example, the removable tactile input layer 160 may include a keycap operatively coupled to a rubber dome or popple forming a mechanical keyboard key among a plurality of mechanical keyboard keys formed in a tray, grid or other support structure formed of a suitable material. User interactive illumination may also be viewable through the removable tactile layer 160 installed on the sealed input surface 161 to provide feedback to a user indicating detection or guidance for user touch inputs, user touchless gesture inputs, or status for keypress inputs depending on usage mode operating for capacitive sensor pads of the capacitive pads layer 163 of the keyboard sensing hardware structure 162 in an embodiment. Portions of the removable tactile input layer 160, such as keyboard keys or support surface structure, may be transparent or opaque and transmissive of user interactive illumination from mini-light emitting diodes (LEDs) formed with the keyboard sensing hardware structure 162 formed under the sealed input surface 161 of the keyboard chassis in an embodiment. Further, the sealed input surface 161 may be transparent or otherwise light transmissive as well in an embodiments.

Plural removable tactile input layers 160 with various keyboard structure layouts may be installed and operated with the keyboard sensing hardware structure 162 formed under the sealed input surface 161 of the chassis of information handling system 100 in embodiments herein. In this example embodiment, instead of the rubber dome having a switch or activating a switch on a printed circuit board (PCB), the keycap and rubber dome may be used to help provide location of a key in the removable tactile input layer and over the keyboard sensing hardware structure 162 formed under the sealed input surface 161 as well as provide tactile feedback to the user. The location of corresponding capacitive sensing pads in capacitive sensing pads layer 163 may correspond to keyboard keys when a keyboard removable tactile input layer 160 is installed on top of the sealed input surface 161. No physical engagement with keypress sensing electronics is required in the removable tactile input layer 160 and, accordingly, the removable tactile input layer 160 is easily removable and replaceable for any of a plurality of removable tactile input layers 160 that can be replaced and used with the keyboard sensing hardware structure 162 formed under the sealed input surface 161. In this example embodiment, the removable tactile input layer 160 may also include scissor or butterfly arms that also provide tactile feedback to the user while facilitating the recoil of the keycap upwards for tactile feedback of a keypress to a user. However, the removable tactile input layer 160 does not include any electrical elements that are used to receive electrical signals as the user presses the keys. Therefore, in the embodiments herein, the removable tactile input layer 160 does not include a PCB layer, a flexible PCB layer, or other electrical components that other keyboards may use to detect the press of a key by the user. Instead, in the embodiments herein, the split-keyboard structure 156 includes the keyboard sensing hardware structure 162 formed under the sealed input surface 161 where those keypress strokes of the keys on the removable tactile input layer 160 are capacitively detected, thus contactlessly sensed.

The keyboard sensing hardware structure 162 formed under the sealed input surface 161 may include a plurality of layers used to detect those keypress keystrokes during actuation of keyboard keys on the removable tactile input layer 160 of the split-keyboard structure 156 above the sealed input surface 161. In an embodiment, the sealed input surface 161 may be sealed such that liquids, dust, and other contaminants cannot enter into the base chassis portion of the information handling system 100. This prevents those contaminants from damaging those hardware elements formed into the housing of the base portion of the information handling system 100.

In an example embodiment, the keyboard sensing hardware structure 162 formed under the sealed input surface 161 may include a capacitive pads layer 163. The capacitive pads layer 163 includes a plurality of capacitive sensor pads that may correspond to keyboard keys in the removable tactile input layer 160 to detect capacitive changes due to actuation of those keyboard keys of the removable tactile input layer 160 above the sealed input surface 161 of the chassis of the information handling system. Further, the capacitive pads layer 163 includes a plurality of capacitive sensor pads to detect capacitive changes due to touch input by a user's fingers on keys or I/O structures on the removable tactile input layer in an embodiment. In yet another embodiment, the capacitive pads layer 163 may include the plurality of capacitive sensor pads that may detect capacitive changes due to sensing proximate location of the user's body part, including fingers or hand for a touchless gesture, above those keyboard keys of the removable tactile input layer 160 and above the sealed input surface 161 of the chassis of the information handling system.

In an embodiment, these capacitive sensor pads may be made of deposited carbon pads which may be delicate, but are protected and sealed under the sealed input surface 161 of the chassis of the information handling system 100 for the keyboard sensing hardware structure 162. The deposited carbon capacitive sensing pads of the capacitive pads layer have a benefit of very low cost and simple manufacturing via deposition or masked spraying to form these deposited carbon capacitive sensing pads. In an embodiment, these capacitive sensing pads of deposited carbon may be configured to vary an electric field in response to changes in nearby capacitance. These carbon-based patches may be arranged in a sensor matrix of capacitive sensing pads and may be printed, sputtered, or otherwise deposited on a non-conductive substrate such as an ABS polymer surface such as the underside of the sealed input surface 161 or on a PCB or flexible PCB at very low cost. In an embodiment, the array of deposited carbon patches for the capacitive sensing pads in the capacitive pads layer 163 may be arranged such that each keyboard key of the removable tactile input layer 160 aligns vertically over the sealed input surface 161 with a deposited carbon patch capacitive sensing pads of the keyboard sensing hardware structure 162 formed under the sealed input surface 161 in embodiments herein.

In an embodiment, each of the plurality of capacitive sensor pads in the capacitive pads layer 163 may be operatively coupled to a capacitive sensor microprocessor 167 executing machine readable code instructions of a capacitive sensor driver 166. In an embodiment, each of the carbon capacitive sensing pads that form the plurality of capacitive sensor pads of the capacitive pads layer 163 may be operatively coupled to a capacitive sensor microprocessor 167 via carbon or other conductive traces formed on a surface or within layers such as a printed circuit board (PCB), a flexible PCB, or on an ABS surface, or some combination in embodiments described herein. It is also appreciated that other types of traces may be formed to operatively couple the carbon pads to the capacitive sensor microprocessor 167 executing machine readable code instructions of the capacitive sensor driver 166 such as silver traces, copper traces or indium tin oxide (ITO) that allow each of the carbon pads to conduct signals detecting capacitive changes due to interaction with the capacitive fields of the capacitive sensor pads to the capacitive sensor driver 166. One or more capacitive sensor microprocessors 167 executing one or more capacitive sensor drivers 166 may operate according to embodiments herein for determination of a particular keyboard key keypress, determination of a user's touch input, or determination of a user's touchless gesture input at or near the keys or other input/output surfaces the removable tactile input layer 160 for the split-keyboard structure 156. As described in embodiments herein, touch or touchless gestures on the keys or other input/output surfaces may involve movement of a user's finger or hand across plural locations and that movement sensed by a plurality of capacitive sensor pads. One or more capacitive sensor drivers 166 may be executed by one or more capacitive sensor microprocessors 167 to detect and determine which of the plurality of keys on the removable tactile input layer 160 have been pressed, touched or hovered above and detected at each of the plurality of capacitive sensor pads based on location and a detected level of capacitance change. For example, the capacitive sensor microprocessor 167 executing the machine readable code instructions of the capacitive sensor driver 166 may relay keypress inputs detected from at least one capacitive sensing pad to the hardware processor 102 for processing of a keystroke as input to the information handling system 100 in embodiments herein.

The host microprocessor 168 executing machine readable code instructions of a user input capacitive pad sensing illumination orchestration system **149*a* in an embodiment may provide user interaction illumination as visual feedback for various types of user input received at capacitive sensor pads of the capacitive pads layer 163 in the form of light emitting diode (LED) illumination co-located with the keyboard sensing hardware structure 156 formed beneath the sealed input surface 161 of the base chassis. For example, the color, intensity level, location or movement direction of illumination from LEDs co-located in the keyboard sensing hardware structure 156 specific to the currently detected usage input mode, which may include the key press input mode, the touch input mode, and the touchless gesture input mode, at the location of user input at the removable tactile input layer 160 as capacitively detected by the capacitive pads layer 163. As described in a particular embodiment herein, a plurality of capacitive sensor microprocessors, such as 167, in various embodiments herein may be operatively coupled to a host microprocessor 168 executing machine readable code instructions 118 of a regional capacitive pad gesture sensing orchestration system 149*b* to detect a user touch or hover gesture based on sensed capacitive changes from groups of capacitive sensor pads received from a plurality of the capacitive sensor microprocessors 167** associated with different usage input modes, including a key press input mode, a touch input mode, and a touchless gesture input mode.

User input received while in touch input mode may include, for example, a user drawing with a finger across a plurality of individual keys of a keyboard of the removable tactile input layer 160 or across a portion of the top surface of the removable tactile input layer 160 installed on a sealed input surface 161 of a base chassis of the information handling system 100. For example, touch input may be received on a removable tactile input layer 160 situated to either side of a trackpad 153 thereon or even on a sealed input surface 161 directly without any removable tactile input layer 160 installed in some embodiments. User input received while in touchless gesture input mode may include, for example, a user gesturing with a hand or portion thereof above the surface of the removable tactile input layer 160 when the chassis is in an open position, or above the lid of the chassis of the information handling system 100 when in a closed position. The host microprocessor 168 executing machine readable code instructions 118 of a user input capacitive pad sensing illumination orchestration system 149*a* in an embodiment may provide visual feedback of user input received at capacitive sensor pads in the capacitive pads layer 163 in the form of light emitting diode (LED) illumination beneath the removable tactile input layer 160 at the location of detected user input and in a color or intensity level associated with the currently detected usage input mode, which may include the key press input mode, the touch input mode, and the touchless gesture input mode.

In an embodiment, a manufacturer may set a key press input mode capacitive change threshold value defining a minimum change in capacitance detectable at a capacitive pad sensor of the capacitive pads layer 163 sufficient to trigger a key press input mode for sensing user keypress inputs on keyboard keys of a removable tactile input layer 160. In another embodiment, a manufacturer may set a touch input mode capacitive change threshold value between the key press input mode capacitive change threshold value and a touchless gesture input mode capacitive change threshold value, described below, defining a range of changes in capacitance detectable at a capacitive pad sensor of the capacitive pads layer 163 sufficient to trigger a touch input mode for sensing user touch input via touch contact across the surface of the removable tactile input layer 160 or keyboard keys of a removable tactile input layer 160. Still further, the manufacturer in an embodiment may further set a touchless gesture input mode capacitive change threshold value that is less than the user touch input mode capacitive change threshold value defining a change in capacitance detectable at a capacitive pad sensor of the capacitive pads layer 163 to trigger a touchless gesture input mode for sensing user input via a hand or finger gesture above the removable tactile input layer 160. The touchless gesture input mode capacitive change threshold value may be a range of capacitive change values below which a capacitive change detected a capacitive pad sensor is determined to comprise a touchless gesture input for touchless gesture input mode. Each of these usage input modes may also be associated with a color or range of light intensity (e.g., with key press input mode being associated with a brighter light and touchless gesture input being associated with a dimmer light).

The host microprocessor 168 executing machine readable code instructions 118 of a regional capacitive pad gesture sensing orchestration system 149*b* may operate to switch between one or a plurality of the capacitive sensor microprocessors 167 serially detecting capacitive sensor pads in a keyboard input mode or detecting various sized groups of capacitive sensor pads in user touch input mode or touchless gesture input mode to more efficiently detect a user touch input or touchless gesture input based on sensed capacitive changes from groups of capacitive sensor pads received from the one or plurality of the capacitive sensor microprocessors 167. These groupings of capacitive sensor pads may utilize different sized groups to extend reach of capacitive fields from the group of capacitive sensor pads as well as reduce latency of detecting moving user inputs, such as swipes or cursor movement inputs associated with the different usage input modes, including the touch input mode, and the touchless gesture input mode. The touch inputs, touchless gesture inputs, and moving user input variations thereof would benefit for user interactive illumination feedback through the removable tactile input layers 160 to guide or indicate status of those various user inputs in embodiments herein.

The host microprocessor 168 in an embodiment may execute machine readable code instructions 118 of the user input capacitive pad sensing illumination orchestration system 149*a* to orchestrate emission of light at a color associated with the key press mode at LEDs situated beneath or adjacent to each capacitive pad sensor of the capacitive pads layer 163 at which capacitive changes meeting the key press input mode capacitive change threshold value are sensed. This may provide visual user feedback for user key press input in the form of illumination as it is identified at each key, or across the entire keyboard of the reconfigurable tactile input layer 160 in some embodiments indicating a normal typing operation in keypress input mode.

In other embodiments in which the current usage input mode is the touch input mode, the host microprocessor 168 may execute machine readable code instructions 118 to orchestrate emission of light at another color or another intensity associated with the touch input mode at LEDs situated beneath or adjacent to each capacitive pad sensor of the capacitive pads layer 163. When capacitive changes within the touch input capacitive change threshold range are sensed by the capacitive sensor pads or groups of capacitive sensor pads, execution of the user input capacitive pad sensing illumination orchestration system 149*a* instructs, via host microprocessor 168 or capacitive sensor microprocessors 167, illumination of one or more LEDs generally indicating user touch input mode is active or specific LEDs to provide user feedback illuminating the points along the removable tactile input layer 160 at which user touch input has been detected.

In still another embodiment in which the current usage input mode is the touchless gesture input mode, the host microprocessor 168 may execute machine readable code instructions 118 to orchestrate emission of light at a color or intensity associated with the touchless gesture input mode. Execution of the user input capacitive pad sensing illumination orchestration system 149*a* may provide instruction via host microprocessor 168 or capacitive sensor microprocessors 167 to illuminate LEDs generally in the keyboard sensing hardware structure 162 indicating the touchless gesture input mode is active or at specific LEDs situated beneath each capacitive pad sensor of the capacitive pads layer 163 at which capacitive changes meeting the touchless gesture input capacitive change threshold value are sensed.

In other aspects of embodiments herein, pre-touch illumination may be enabled, in which the host microprocessor 168 operating in the touchless gesture input mode may execute machine readable code instructions 118 of the user input capacitive pad sensing illumination orchestration system 149 to detect when capacitive change levels approaching a minimum user input touch mode capacitive change threshold is approached. For example, the capacitive change levels detected from interaction with a capacitive field of one or more capacitive sensor pads may reach a percentage or value within a value range of the minimum user input touch mode capacitive change threshold or may detect a hover time period expires over a particular one or more capacitive sensor pads. In such an embodiment, execution of the user input capacitive pad sensing illumination orchestration system 149*a* may provide instruction via host microprocessor 168 or capacitive sensor microprocessors 167 to instruct emission of light via LEDs situated beneath or adjacent to those capacitive sensor pads of the capacitive pads layer 163 sensing capacitive changes approaching the minimum user input touch mode capacitive change threshold prior to the user making contact with a finger or portion of a hand one the removable tactile input layer as a guidance or indication of preparation for receiving touch input or even a keypress input.

In an embodiment, the sealed input surface 161 may include an active shielding layer 164 to shield the plurality of capacitive sensor pads within the capacitive pads layer 163 from a grounding layer 165 serving as an electromagnetic interference (EMI) shield for hardware components in the base chassis and as a grounding source for the split-keyboard structure 156. The active shielding layer 164 may act to prevent parasitic capacitive grounding by forcing capacitive fields of capacitive sensor pads in the capacitive pads layer 163 to go around the active shielding pad or pads before reaching ground. Parasitic capacitive grounding by the grounding layer 165 may otherwise disrupt the operation of the plurality of capacitive sensor pads of the capacitive pads layer 163 by substantially reducing the reach of the capacitive fields. In an embodiment, the active shielding layer 164 may be operatively coupled to a voltage source as controlled by the capacitive sensing microcontroller 167 such that the voltage level of the active shielding in the active shielding layer 164 is held at about that of the capacitive sensing pads of the capacitive pads layer 163 to prevent this parasitic capacitive grounding of the capacitive sensing pads by the grounding layer 165. This grounding layer 165 is used for split-keyboard structure 156 grounding and EMI and noise shielding, but due to the thin profile of the keyboard sensing hardware structure 162 formed under the sealed input surface 161, the grounding layer 165 is potentially close to the capacitive sensing layer 163 and may disrupt the operation of the plurality of capacitive sensor pads (e.g., carbon pads) within the capacitive pads layer 163 via this parasitically grounding capacitance of those capacitive sensing pads from detecting other capacitive changes due to user inputs. This active shielding layer 164 may be driven using the same voltage as the plurality of capacitive sensor pads within the capacitive pads layer 163 in some embodiments. This reduces parasitic capacitance between the plurality of capacitive sensor pads of the capacitive pads layer 163 and the grounding layer 165 placed below the active shielding layer 164. Thus, the active shielding layer 164 improves signal-to-noise ratio and extends capacitive sensing range of the plurality of capacitive sensor pads of the capacitive pads layer 163 in the keyboard sensing hardware structure 162 formed under the sealed input surface 161.

In an embodiment, the grounding layer 165 may provide a stable electrical reference for the active circuitry of the keyboard sensing hardware structure 162 formed under the sealed input surface 161 and help to define signal baseline at the plurality of capacitive sensor pads. It is appreciated that other hardware components of the information handling system 100 may be placed below the grounding layer 165 that may include an information handling system hardware mainboard that may house the hardware processor 102, other processing devices (e.g., 104, 106, 108, 110), the PMU 128, the wireless interface adapter 130, the radio 131, the RF front end 132, and the antenna 133 among other hardware components. Thus, the grounding layer 165 may prevent any EMI and noise from those hardware components also from affecting the operation of other nearby computing device to information handling system 100 in embodiments herein.

The systems and methods described herein, therefore, provides for a split-keyboard structure 156 that can operate even when contaminants are accidentally introduced into the removable tactile input layer 160 such as liquids. If damaged, the mechanical keyboard keys of the removable tactile input layer 160 may be removed and replaced with another removable tactile input layer 160 for use with the keyboard sensing hardware structure 162 formed under the sealed input surface 161 and without replacement of the electronics for sensing keypress, touch, and touchless gesture inputs in embodiments herein.

By bifurcating the split-keyboard structure 156 into a purely mechanical removable tactile input layer 160 and the keyboard sensing hardware structure 162 formed under the sealed input surface 161, damage to the split-keyboard structure 156 can be limited, from a spill for example, to the removable tactile input layer 160. The electronic devices of the keyboard sensing hardware structure 162 formed under the sealed input surface 161 in split-keyboard structure 156 and the hardware components of the information handling system 100 remain sealed within the sealed input surface 161 protected from damage. Still further, the split-keyboard structure 156 of the present specification also provides for a swappable removable tactile input layer 160 that allows for repair or replacement of the removable tactile input layer 160 if and when contaminants have been introduced into the mechanical parts of the removable tactile input layer 160. Even further, the split-keyboard structure 156 of the present specification also provides for a swappable removable tactile input layer 160 that accommodates for different types of keyboard layouts thereby accommodating for various typists who are using the information handling system 100.

Because of the layout of the various layers of the split-keyboard structure 156, the split-keyboard structure 156 may not only operate with the keyboard sensing hardware structure 162 formed under the sealed input surface 161 to recognize tactile input such as a keypress or touch input at the removable tactile input layer 160, but may also recognize when a user's fingers are hovering over the keys of the split-keyboard structure 156 and above those keys in a touchless gesture function. This allows for touchless gestures as well as touch inputs and keypresses to be received at the split-keyboard structure 156 sensed by contactless capacitive sensing with the keyboard sensing hardware structure 162 formed under the sealed input surface 161. The host microprocessor 168 or capacitive sensor microprocessors 167 may execute machine readable code instructions of the user input capacitive pad sensing illumination orchestration system **149*a* to instruct LEDs in the keyboard sensing hardware structure 162 to provide user interactive illumination to the user for any of a touchless gesture input mode, a user touch input mode, or even a keypress input mode. Touch input and touchless gestures may include swiping gestures and the like in order to provide various different types of input at the removable tactile input layer 160 of the split-keyboard structure 156** and user interactive illumination may guide those types of user inputs that other keyboards may not be capable of receiving.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2A:
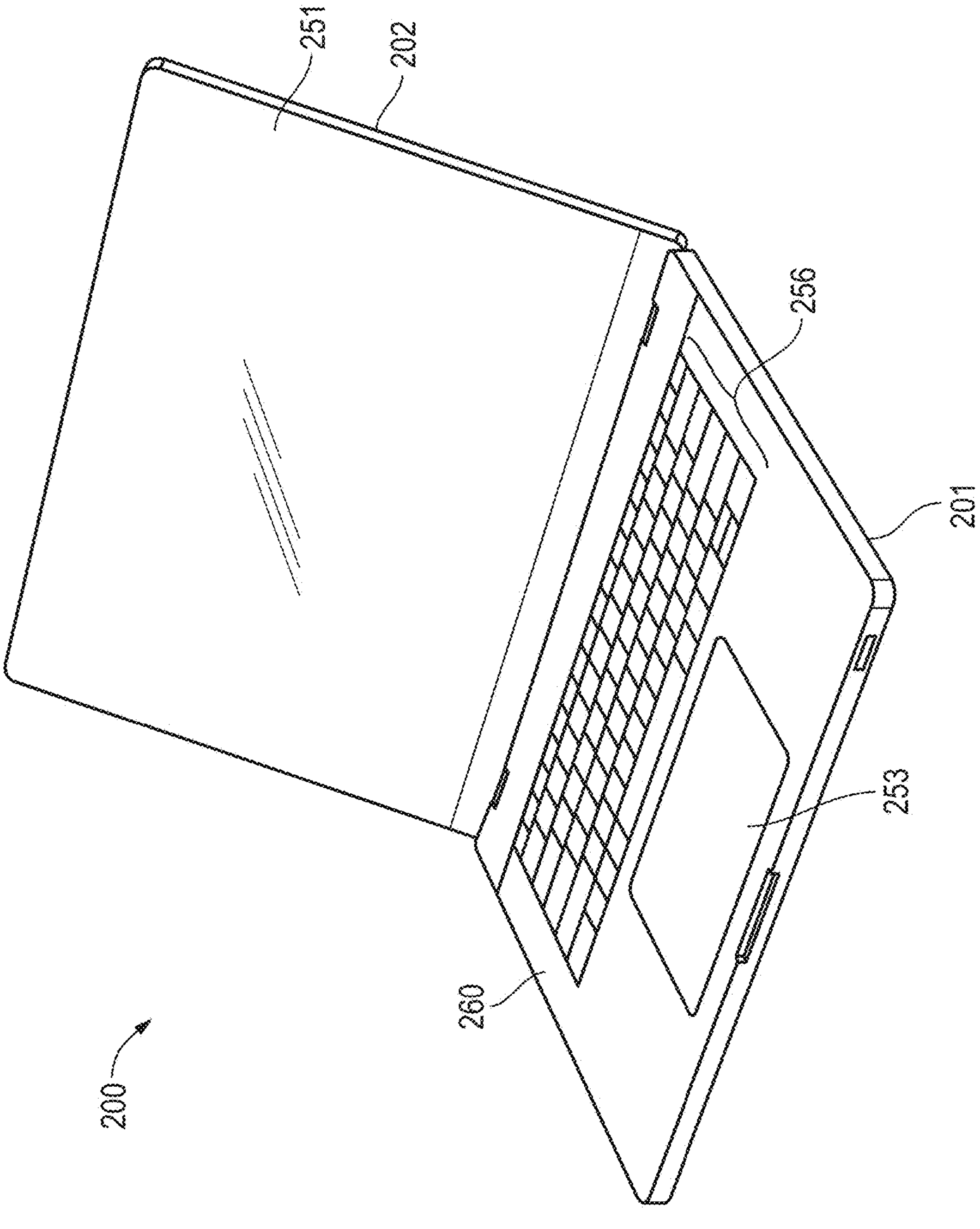
FIG. 2A is a graphic diagram illustrating an information handling system that includes a split keyboard stack structure having a separate removable tactile input layer and a sealed input surface having a keyboard sensing hardware structure formed under the sealed input surface to capacitively receive user keypress input, user touch input, and user touchless gesture input from a user according to an embodiment of the present disclosure.

FIG. 2A is a graphic diagram illustrating an information handling system 200 that includes a split-keyboard structure having a removable tactile input layer and a separate keyboard sensing hardware structure formed under a sealed input surface to receive keyboard, touch and gesture input contactlessly at capacitive sensor pads from a user according to an embodiment of the present disclosure. As described herein, the information handling system 200 may be a laptop-type information handling system 200. The laptop-type information handling system 200 may include a base chassis 201 and a display chassis 202. Therefore, FIG. 2A shows a lid portion of the laptop-type information handling system 200 that is a display chassis 202 that includes a video/graphics display device 250 to provide output to the user and for the user to provide input in those embodiments where the video/graphics display device 250 is a touch-screen display device. The laptop-type information handling system 200 also includes a base chassis 201, hinged to the display chassis 202, that may house information handling system hardware components as described in connection with FIG. 1 as well as various ports. The base chassis 201 in various embodiments further includes the separate keyboard sensing hardware structure formed under a sealed input surface (not shown) of the base chassis 201 and have a separate mechanical removable tactile input layer 260 installed on top of the sealed input surface of the base chassis 201 according to embodiments herein.

In an embodiment, the base portion 201 of the laptop-type information handling system 200 may include the keyboard structure 256 in the removable tactile input layer 260 forming a first portion of the split-keyboard structure as described in embodiments herein. FIG. 2A shows the removable tactile input layer 260 that has been coupled to or otherwise installed to a sealed input surface (not shown) as described in connection with FIG. 1. FIG. 2A also shows a trackpad 256 installed in the base portion of the laptop-type information handling system 200. This trackpad 253 may also be used by the user to provide input to the information handling system 200. In an embodiment, the trackpad 253 may form part of the removable tactile input layer 260 and may operate similarly to those keyboard keys present within the keyboard structure 256 of the removable tactile input layer 260 and be contactlessly detected by the separate keyboard sensing hardware structure formed under a sealed input surface in some embodiments. Alternatively, the trackpad 253 may form a different part of the top layer of the base chassis 201 of the information handling system 200 and may operate independently of the keyboard structure 256 that forms the removable tactile input layer 260. In the latter embodiment, the trackpad 253 operates to receive touch and clicks at the surface of the trackpad 253 with the trackpad 253 and includes trackpad electrical circuits to receive that input separate from the keyboard sensing hardware structure formed under a sealed input surface to receive keyboard, touch and gesture input contactlessly at capacitive sensor pads from a user in the keyboard structure 256 or other structure of the removable tactile input layer 260.

As described herein, a capacitive sensor microprocessor in an embodiment may execute a capacitive sensor driver to scan a plural array of capacitive sensor pads disposed beneath the removable tactile input layer 260, based on a current usage input mode, which may include a key press input mode, a touch input mode, or a touchless gesture input mode. A touchless gesture input in an embodiment may include the user gesturing with a hand or finger above the surface of the removable tactile input layer 260 when the chassis 202 for the information handling system 200 is in an open position or above the surface the chassis lid when the chassis 202 is in a closed position. A touch input in an embodiment may comprise, for example, a user drawing with a finger across a plurality of individual keys of the keyboard 256 or across a portion of the top surface of a removable tactile input layer 260 installed on a sealed input surface of a base chassis 201 of the information handling system 200. More specifically, touch input may be received on a removable tactile input layer 260 situated to either side of a trackpad 253 thereon or even on a sealed input surface without any removable tactile input layer 260 installed in some embodiments. User input received while in touchless gesture input mode may include, for example, a user gesturing with a hand or portion thereof above the surface of the removable tactile input layer 260 when the chassis is in an open position, or above the lid of the chassis of the information handling system 200 is in a closed position.

Figure 2B:
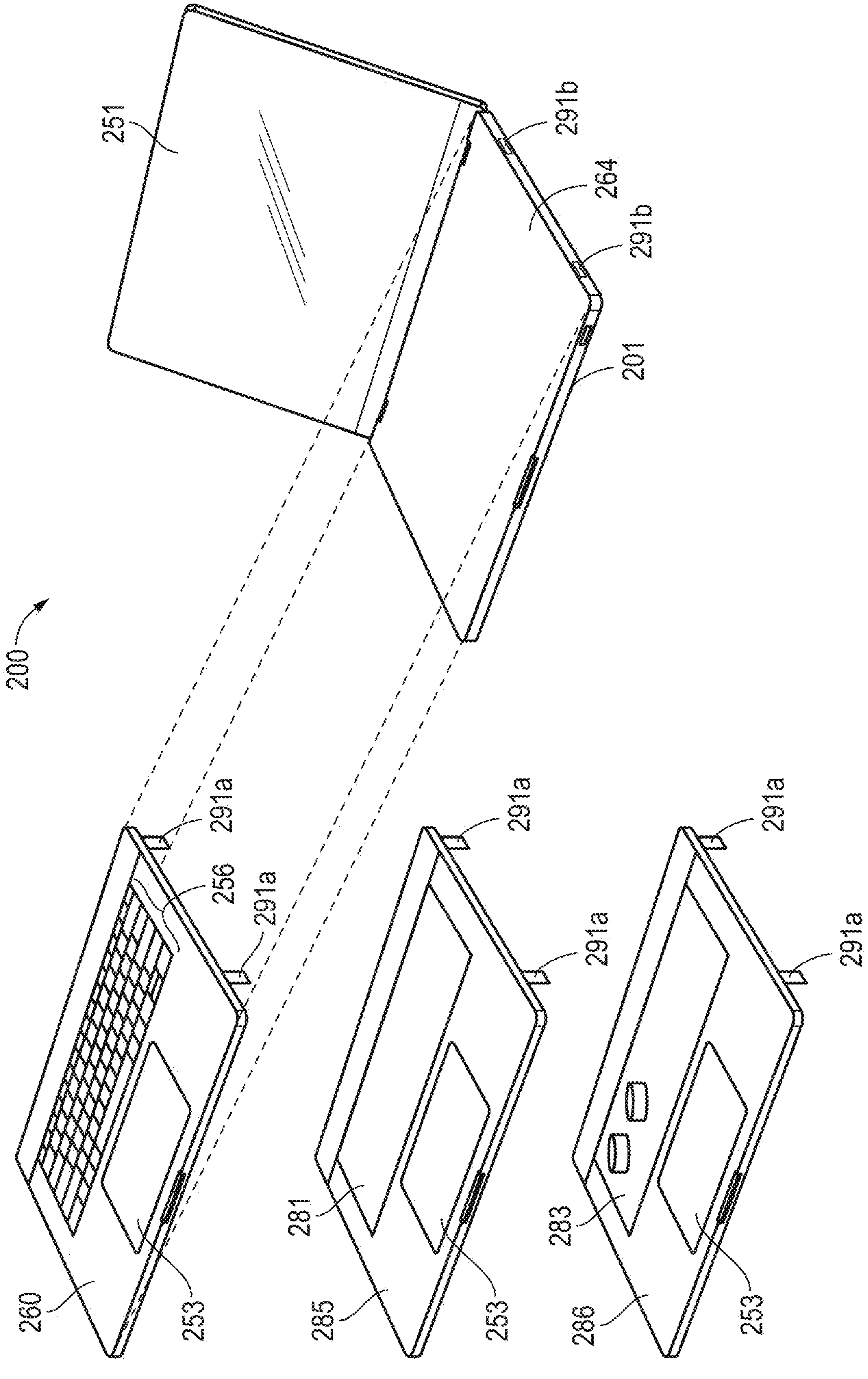
FIG. 2B is a graphic diagram illustrating an information handling system that includes an exploded depiction of a keyboard removable tactile input layer, a control board removable tactile input layer, and a drawing pad removable tactile input layer that are interchangeably couplable to the sealed input surface having a keyboard sensing hardware structure formed thereunder according to an embodiment of the present disclosure.

FIG. 2B is a graphic diagram illustrating an information handling system 200 that includes a plurality of removable tactile input layers that may be installed and a separate keyboard sensing hardware structure formed under a sealed input surface to receive keyboard, touch and gesture input contactlessly at capacitive sensor pads from a user according to an embodiment of the present disclosure. As shown in FIG. 2B, the removable tactile input layers 260, 285 and 286 have been removed from the information handling system 200 to show the sealed input surface 264 of the base chassis 201 of the information handling system 200. The removable tactile input layers 260, 285 and 286 are shown as installable onto the sealed input surface 264 of the base chassis 201 of information handling system 200 according to various embodiments herein.

In an embodiment, the keyboard removable tactile input layer 260 including a keyboard structure 256 may be swapped with other input layers that may include a control board removable tactile input layer 286 or a drawing pad removable tactile input layer 285 among other types of removable tactile input layers. It is appreciated that the keyboard removable tactile input layer 260, the control board removable tactile input layer 286, and the drawing pad removable tactile input layer 285 may be only three examples of swappable removable tactile input layers that may be affixed to the top of the sealed input surface 264 using, for example, reciprocal removable tactile input layer coupling system structures 291*a* and 291*b*. Thus, each of the keyboard removable tactile input layer 260, the control board removable tactile input layer 286, and the drawing pad removable tactile input layer 285 may include a removable tactile input layer coupling system structure 291*a*, such as a latch, latch receiver, or interference fit structures, magnetic structures or the like. This removable tactile input layer coupling system structure 291*a* interfaces with reciprocal matching removable tactile input layer coupling system structure 291*b* formed on the base chassis 201 or in the sealed input surface 264 of the base chassis 201 of information handling system 200. Interfacing of reciprocal removable tactile input layer coupling system structures 291*a* and 291*b* may be formed along, for example, a periphery of the removable tactile input layers 260, 285, 286 and the sealed input surface 264 or along a bottom surface of the frame or tray support structure of the removable tactile input layers 260, 285, 286 and a top surface area of the sealed input surface 264 of the base chassis 201. Additional embodiments may include reciprocal removable tactile input layer coupling system structures 291*b* formed on a side of base chassis 201 of information handling system 200. It is appreciated that any type of reciprocal removable tactile input layer coupling system structures 291*a* and 291*b* may be used to selectively secure any of the various removable tactile input layers 260, 285, and 286 to the sealed input surface 264. The reciprocal removable tactile input layer coupling system structures 291*a* and 291*b* may include any latch, fastener, interference fit edges, grooves or other interference fit structures, or other mechanical device that the user may access to remove the keyboard removable tactile input layer 260, the control board removable tactile input layer 286, or the drawing pad removable tactile input layer 285 from the sealed input surface 264 of the base chassis 201.

In an embodiment, the keyboard removable tactile input layer 260 may include a keyboard structure 256 with any number and layout of keyboard keys that include mechanical tactile feedback structures only. Plural keyboard removable tactile input layers 260 with a variety of keyboard layouts may be installed on the sealed input layer 264 with reciprocal removable tactile input layer coupling system structures 291*a* and 291*b* and operate with the separate keyboard sensing hardware structure formed under a sealed input surface 264 to receive keyboard, touch and gesture input contactlessly at capacitive sensor pads therein. The keyboard layout of each keyboard removable tactile input layer 260 include removable tactile input layer identification structures or devices that may be detected by detectors in the separate keyboard sensing hardware structure formed under a sealed input surface according to various embodiments described herein to identify the type of keyboard layout of keyboard structure 256 for the installed keyboard removable tactile input layer 260.

In an embodiment, the control board removable tactile input layer 286 may include a control surface 283 that allows a user to provide a different type of control and input to the information handling system 200. This may include any number of knobs, slides, and touch surfaces that allows the user to provide such input. Again, removable tactile input layer identification structures or devices that may be detected by detectors in the separate keyboard sensing hardware structure formed under a sealed input surface according to various embodiments described herein to identify the control board removable tactile input layer 286 is installed.

In an embodiment, the drawing pad removable tactile input layer 285 may include a drawing surface 281. The drawing surface 281 may allow a user to provide touch input at the drawing pad removable tactile input layer 285 to, for example, provide drawing strokes at the drawing surface 281. It is appreciated that because the sealed input surface 264 and lower stacks within the base portion of the information handling system 200 includes capacitive sensor pads, the user may provide both tactile input at the drawing surface 281 as well as gesture input above the surface of the drawing surface 281 to provide different types of input. Again, removable tactile input layer identification structures or devices that may be detected by detectors in the separate keyboard sensing hardware structure formed under a sealed input surface according to various embodiments described herein to identify the drawing pad removable tactile input layer 285 is installed.

In embodiments herein, user touch input may include, for example, a user drawing with a finger across a plurality of individual keys of the keyboard 256 or across a portion of the top surface of any removable tactile input layers 260, 285, or 286 installed on a sealed input surface 261 of a base chassis 201 of the information handling system 200. More specifically, touch input may be received on a removable tactile input layer 260 situated to either side of a trackpad 253 thereon or on keyboard 256 in an embodiment. In another embodiment, user touch input may be received on removable tactile input layer 285 including on a drawing surface 281. In another embodiment, user touch input may be received on removable tactile input layer 286 including on a control surface 283. In yet another embodiment, user touch input may be received directly on a sealed input surface 261 without any removable tactile input layer 260 installed in some embodiments. User input received while in touchless gesture input mode may include, for example, a user gesturing with a hand or portion thereof above the surface of the removable tactile input layers 260, 285, or 286 when the chassis is in an open position, or above the lid of the display chassis of the information handling system 200 is in a closed position. In various embodiments herein, user interactive illumination directed by execution of a user input capacitive pad sensing illumination orchestration system of the present disclosure may be provided to indicate usage mode engaged or to guide user inputs such as user touch inputs or touchless gesture inputs during interactions with the split keyboard structure and various removable tactile input layers 260, 285, or 286 or directly with the sealed input surface 264.

Figure 3:
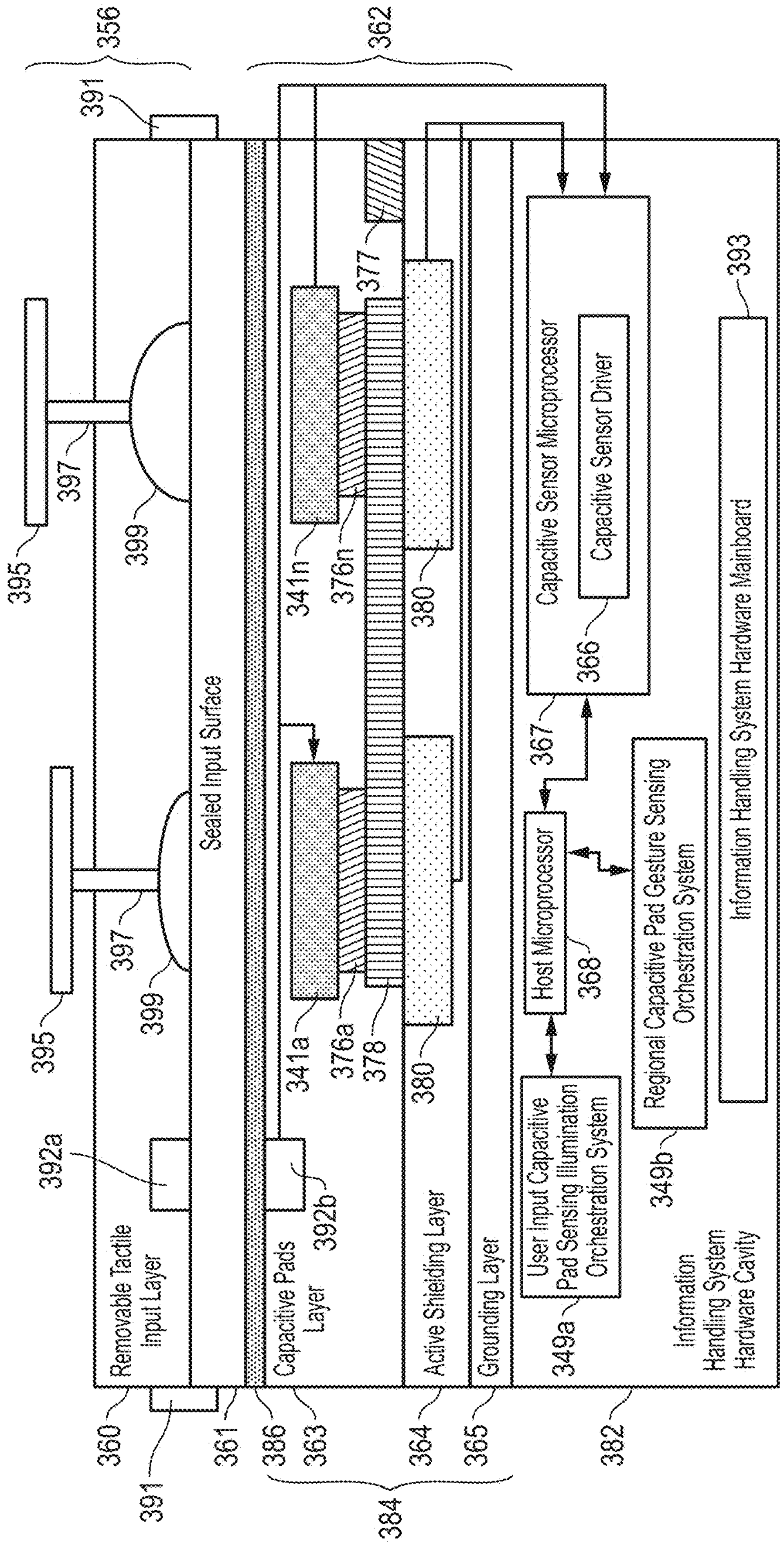
FIG. 3 is a graphic and block diagram illustrating a split keyboard stack structure that includes a removable tactile input layer and a separate sealed input surface having a keyboard sensing hardware structure formed under the sealed input surface to receive keyboard, touch and gesture input at capacitive sensor pads and to provide user interaction illumination according to an embodiment of the present disclosure.

FIG. 3 is a graphic diagram illustrating a split-keyboard structure stack that includes a removable tactile input layer and a separate keyboard sensing hardware structure formed under a sealed input surface to receive user input contactlessly at capacitive sensor pads and provide user interactive illumination according to an embodiment of the present disclosure. As described herein, a host microprocessor 368 executing machine readable code instructions of a user input capacitive pad sensing illumination orchestration system 349*a* in an embodiment may provide user interaction illumination as visual feedback for user input received at capacitive sensor pads 341*a* to 341*n* in the form of light emitting diode (LED) 376*a* to 376*n* illumination co-located with the keyboard sensing hardware structure 356 formed beneath sealed input surface 361 of the base chassis of an information handling system. For example, the color, intensity level, location or movement direction of illumination from LEDs 376*a* to 376*n* co-located in the keyboard sensing hardware structure 356 specific to the currently detected usage input mode, which may include the key press input mode, the touch input mode, and the touchless gesture input mode, and currently detected user input at the location of detected user input at the removable tactile input layer 360.

The split-keyboard structure stack up includes a keyboard structure 356 disposed beneath a removable tactile input layer 360 and may further include a number of separate layers that form the keyboard sensing hardware structure 362 formed under a sealed input surface 361. The keyboard sensing hardware structure 362 includes interface detection electronics, such as capacitive sensing pads 341*a* to 341*n*, and operates to contactlessly detect user input received on or above the removable tactile input layer 360 installed above the sealed input surface 361 and through which the user may provide input into the information handling system. Plural removable tactile input layers 360 may be installed onto the sealed input surface 361 of the split keyboard stack structure of FIG. 3 and swapped out according to embodiments herein. Reconfigurable tactile input layer identification sensor devices 392*a* and 392*b*, such as radiofrequency identification sensors, magnetic sensors, or others, may be installed within the removable tactile input layer 360 and under the sealed input surface 361 on the keyboard sensing hardware structure flexible PCB circuit 384 or other printed circuit board or membrane used for the keyboard sensing hardware structure of embodiments herein. The reconfigurable tactile input layer identification sensor devices 392*a* and 392*b* are used to identify the installed type of reconfigurable tactile input layer 360 such that the capacitive sensor microprocessors 367 executing machine readable code instructions of the capacitive sensor drivers 368 may detect and recognize the inputs received from various types of installed reconfigurable tactile input layers 360, such as from different keyboard layouts thereon.

The removable tactile input layer 360 may be that layer that a user interacts with via keypress of mechanical keyboard keys 395 of keyboard structure 356, touch input, or touchless gesture input above to provide input to the information handling system. This removable tactile input layer 360 may include only mechanical elements such as mechanical keyboard keys 395 of keyboard structure 356 formed into a grid, frame, or tray support structure of suitable material, such as plastic or ABS, to provide tactile response to the user when the mechanical keyboard keys 395 are pressed. In a specific example, the removable tactile input layer 360 may include a keycap or keyboard key 395 that includes a keyboard key post 397. The keyboard key 395 and keyboard key post 397 may be operatively and mechanically coupled to a keyboard key rubber dome 399 or popple. In this example embodiment, instead of the keyboard key rubber dome 399 having a switch or activating a switch on a PCB, the keyboard key rubber dome 399 may be used to help provide tactile feedback to the user such that the mechanical features imitate typical interactions with other types of keyboards. In some example embodiments, the removable tactile input layer 360 may also include scissor or butterfly arms (not shown) that also provide tactile feedback to the user while facilitating the recoil of the keyboard key 395 and keyboard key post 397 upwards for the keyboard structure 356. Thus, the removable tactile input layer 360 provides a simulated tactile feel to the user such that the user may feel when actuating the keys on any keyboard, however the removable tactile input layer 360, which may include the keyboard structure 356, may be easily replaced without replacement of keyboard electronics should damage occur to any of the keyboard keys 395.

Thus, the removable tactile input layer 360 does not include any electrical elements that are used to receive electrical signals as the user presses the keyboard keys 395. Therefore, in the embodiments herein, the removable tactile input layer 360 does not include a PCB layer, a flexible PCB layer, contact switches or other electrical keypress detectors, or other electrical components that other keyboards may use to detect the press of a key by the user. Instead, in the embodiments herein, any number of removable tactile input layers 360, which may include a keyboard structure 356 without electrical keyboard components in some embodiments, operate with a separate keyboard sensing hardware structure 362 formed under the sealed interface layer 361 that includes interface detection electronics, such as capacitive sensing pads, that can contactlessly detect user input. User interactive illumination may also be viewable through the removable tactile layer 360 installed on the sealed input surface 361 to provide feedback to a user indicating detection or guidance for user touch inputs, user touchless gesture inputs, or status for keypress inputs depending on usage mode operating for capacitive sensor pads 341*a* to 341*n* of the keyboard sensing hardware structure 362 in an embodiment. Portions of the removable tactile input layer 360, such as keyboard keys or support surface structure, may be transparent or opaque and transmissive of user interactive illumination from mini-light emitting diodes (LEDs) 376*a* to 376*n* formed with the keyboard sensing hardware structure 362 formed under the sealed input surface 361 of the keyboard chassis in an embodiment. Further, the sealed input surface 361 may be transparent or otherwise light transmissive as well in an embodiment.

In one embodiment shown in FIG. 3, the removable tactile input layer 360 may be installed on the sealed input surface 361 using reciprocal removable tactile input layer coupling system structures 391 on the sealed input layer 361 (or base chassis) and on the removable tactile input layer 360. In embodiments herein, the reciprocal removable tactile input layer coupling system structures 391 may include reciprocal latching mechanisms, reciprocal interference fit structures, reciprocal magnetic devices, or other coupling devices that allows user to couple and decouple the removable tactile input layer 360 to the sealed input layer 361 or the base chassis. This reciprocal removable tactile input layer coupling system structures 391 such as reciprocal latching mechanism structures, reciprocal interference fit structures, reciprocal magnetic devices, or other coupling structures allow a user to quickly decouple the removable tactile input layer 360 from the sealed input layer 361 in order to repair or replace the removable tactile input layer 360 as described herein. In an example embodiment, this reciprocal removable tactile input layer coupling system structures 391 may be a reciprocal latching mechanism that may include small, molded tabs integrated into the removable tactile input layer 360 that engage with matching recesses, slots, or holes formed in the sealed input surface 361 or on the base chassis. It is appreciated that other mechanical devices or mechanical structures may be used to selectively secure the removable tactile input layer 360 to the sealed input surface 361 including rotational latches, magnetic latching mechanisms, hook-and-slot latches, slide locking latches, interference fit grooves or extensions on the perimeter of a tray or grid of the removable tactile input layer 360 that interference fit with a frame or edge of the sealed input surface 361, and other latching or interference fit structures.

In an alternative example embodiment, the removable tactile input layer 360 may be installed onto and operatively coupled to the sealed input surface 361 using an adhesive layer (not shown). This adhesive layer may include any type of glue, tape, or other adhesive that may, at least temporarily, adhere a bottom surface of the removable tactile input layer

360 to a top surface of the sealed input surface 361 that includes the keyboard sensing hardware structure 362 formed under the sealed input surface 361.

As described herein, a separate half of the split-keyboard structure includes the keyboard sensing hardware structure 362 formed under the sealed input surface 361. The keyboard sensing hardware structure 362 formed under the sealed input surface 361 includes, as a top layer, the capacitive pads layer 363. The sealed input surface 361 prevents contaminants and liquids from entering into the remaining portions of the keyboard housing or base chassis of the information handling system. The sealed input surface 361 protects the electronics, such as carbon capacitive sensing pads and circuitry, of the keyboard sensing hardware structure 362 formed under the sealed input surface 361 as well as protecting hardware components, such as a motherboard, hardware processors, memory and other hardware components as described with reference to FIG. 1, that are disposed in the base chassis of the information handling system. This capacitive pads layer 363, an active shielding layer 364, and grounding layer 365 of the keyboard sensing hardware structure 362 formed under the sealed input surface 361 may be formed, for example, on a flexible PCB 384 circuit with a plurality of capacitive sensor pads 341*a* to 341*n* formed on or at the top surface of this flexible PCB 384 circuit. In an embodiment, the capacitive sensor pads 341*a* to 341*n* may include patches of deposited carbon on the flexible PCB circuit 384 configured to vary an electric field in response to changes in nearby capacitance. These carbon-based patches forming the capacitive sensor pads 341*a* to 341*n* of may be arranged in a sensor matrix and, during manufacturing, may be printed, sputtered, or otherwise deposited on the flexible PCB 384 circuit. In an embodiment, the array of deposited carbon patches may be arranged such that each key of the removable tactile input layer 360 aligns vertically above the sealed input surface 361 and a deposited capacitive pad sensor 341*a* to 341*n* (e.g., carbon patch) formed thereunder. In other embodiments, the carbon-based patches forming the capacitive sensor pads 341*a* to 341*n* of may be arranged in a sensor matrix and, during manufacturing, may be printed, sputtered, or otherwise deposited on the underside of the sealed input surface 361. The deposited capacitive sensor pads 341*a* to 341*n* in embodiment herein may be electrically coupled via conductive traces on the underside of the sealed input surface 361 or via the flexible PCB 384 circuit to one or more capacitive sensor microprocessors 367 and a power source (not shown).

As described herein, each of the capacitive sensor pads 341*a* to 341*n* of the capacitive pads layer 363 may be operatively coupled to one of a plurality of capacitive sensor microprocessors, including 367 executing machine readable code instructions of a capacitive sensor driver 366. In an embodiment, each of the capacitive sensor pads 341*a* to 341*n* that form the plurality of capacitive sensor pads within the capacitive pads layer 363 may be operatively coupled to one of the plurality of capacitive sensor microprocessors, including 367, via carbon traces formed on a surface such as a PCB or a flexible PCB circuit 384 in embodiments described herein. It is also appreciated that other types of traces may be formed to operatively couple the carbon pads of capacitive sensor pads 341*a* to 341*n*, such as copper traces or indium tin oxide (ITO), that allow each of the carbon pads of the capacitive sensor pads 341*a* to 341*n* to conduct signals to the capacitive sensor microprocessor 367 for detection and determination of user input by the execution of the capacitive sensor driver 366. Detection of changes in capacitance at various levels of capacitance change are detected by the capacitive sensor microprocessor 367 and determined by the execution of the capacitive sensor driver 366 as indicative of a user's keypress inputs, a user's touch inputs, or a user's touchless gesture inputs at or near the keyboard keys 395 or other input surfaces of the keyboard structure 356 or the removable tactile input layer 360. The capacitive sensor driver 366 may be executed by the capacitive sensor microprocessor 367 to detect and determine which of the plurality of keyboard keys 395 on the removable tactile input layer 360 have been pressed and detected at corresponding capacitive sensor pads 341*a* to 341*n*. The capacitive sensor microprocessor 367 executing machine readable code instructions of the capacitive sensor driver 366 for processing of keystrokes or user gesture input may relay those inputs received at each of the capacitive sensor pads 341*a* to 341*n* from the capacitive sensor microprocessor 367 to the information handling system hardware mainboard 393 in the information handling system hardware cavity 382. Relay of those keypress inputs, touch inputs, or touchless gesture inputs detected at the capacitive sensor microprocessor 367 are provided as input to any hardware processor on the information handling system hardware mainboard 393 or host microprocessor 368 executing machine readable code instructions of the regional capacitive pad gesture sensing orchestration system as input to the information handling system executing one or more software or firmware applications.

The capacitive pads layer 363 may be part of the flexible PCB 384 that also includes the active shielding layer 364 and the grounding layer 365. The active shielding layer 364 may include a plurality of shielding pads 380 that are formed vertically below each of the capacitive sensor pads 341*a* to 341*n* within the active shielding layer 364 and between the capacitive sensor pads 341*a* to 341*n* and a grounding layer 365. Each of the shielding pads 380 of the active shielding layer 364 may shield the plurality of capacitive sensor pads within the capacitive pads layer 363 from parasitic grounding by the nearby grounding layer 365 formed at the bottom of the flexible PCB 384. The grounding layer 365 and active shielding layer 364 may act as a controlled return path for noise and external EMI that would otherwise disrupt the operation of the plurality of capacitive sensor pads 341*a* to 341*n* of the capacitive pads layer 363. The grounding layer 365 provides EMI and grounding for the electronics of the keyboard hardware sensing structure 362 as well as shielding the capacitive sensor pads 341*a* to 341*n* from the hardware components in the information handling system hardware cavity 382 of the base chassis such as those operating on the information handling system hardware mainboard 393 and described in further detail above with reference to FIG. 1.

In an embodiment, the shielding pads 380 of the active shielding layer 364 may be active shielding pads 380. These active shielding pads 380 may be driven using the same or similar voltage as the plurality of capacitive sensor pads 341*a* to 341*n* within the capacitive pads layer 363 and may also, each, be operatively coupled to the capacitive sensor driver 366 and a power source such as located in the information handling system hardware cavity 382. This reduces parasitic capacitance between the plurality of capacitive sensor pads 341*a* to 341*n* of the capacitive pads layer 363 and the grounding layer 365 placed below the active shielding layer 364 such that the capacitive field of the capacitive sensor pads 341*a* to 341*n* is not as readily grounded reducing range and sensitivity. These active shielding pads 380 of the active shielding layer 364 improve signal-to-noise ratio and extend the sensing range of the plurality of capacitive sensor pads of the capacitive pads layer 363. Indeed, in an embodiment, the active shielding pads 380 allow a user to provide input such as gesture input which may have a low level of change in detected capacitance even when the user is not in physical contact with any of the keyboard keys of the removable tactile input layer 360 above the capacitive sensor pads 341*a* to 341*n* of the capacitive pads layer 363. This is because the capacitive sense capabilities of the capacitive sensor pads 341*a* to 341*n* is extended a distance above the surface of the removable tactile input layer 360 due to the inclusion of the shielding pads 380 of the active shielding layer 364.

As described, the grounding layer 365 may be formed directly below the active shielding layer 364 and forms a bottom-most layer of the flexible PCB 384 of the sealed input surface. The inclusion of the grounding layer 365 allows for the absorption or redirection of stray capacitive coupling or leakage current that might affect signal precision at the plurality of capacitive sensor pads 341*a* to 341*n* plus provides a safety ground for the split-keyboard stack up. In an embodiment, the grounding layer 365 may provide a stable electrical reference from the active circuitry that helps to define signal baseline at the plurality of capacitive sensor pads 341*a* to 341*n*.

It is appreciated that the flexible PCB 384 may form an upper portion of the base chassis of the information handling system just under the sealed input surface 361 that may form a top surface for the housing of the base chassis of the information handling system. However, the base chassis portion of the information handling system also includes the information handling system hardware cavity 382. The information handling system hardware cavity 382 may be present to provide space that other hardware component devices such as the hardware processor (e.g., FIG. 1, 102), memory devices, PMU, radiofrequency adapters, or wired ports to name a few of those hardware component devices that may be formed into the information handling system hardware cavity 382. As shown in FIG. 3, for example, the information handling system hardware cavity 382 may house an information handling system hardware mainboard 393 which may include a PCB that houses the hardware processor, other processing devices (e.g., FIG. 1, 102, 104, 106, 108, 110), the PMU, the wireless interface adapter, the radio, the RF front end, and the antenna among other hardware components. Thus, the grounding layer 365 may prevent any EMI and noise from affecting the operation of the capacitive pads layer 363 as described herein.

As described herein, a plurality of capacitive sensor microprocessors, such as 367 may be included in an embodiment, each operatively coupled to and receiving user input from a plurality of capacitive sensor pads 341*a* to 341*n* within the capacitive pads layer 363 of the split keyboard structure 362. User input received while in touch input mode may include, for example, a user drawing with a finger across a plurality of individual keys 395 of the keyboard or across the removable tactile input layer 360 comprising a portion of the bottom chassis of the information handling system situated to either side of a trackpad.

A touch input mode capacitive change threshold value is set for operation of a capacitive sensor driver 366 by a capacitive sensor microprocessor 367 as coordinated by a regional capacitive pad gesture sensing orchestration system 349*b* or a user input capacitive pad sensing illumination orchestration system 349*a* executing on a host microprocessor 368. User input received while in touch input mode may include, for example, a user drawing with a finger across a plurality of individual keys 395 of the keyboard 356 or across a portion of the top surface of a removable tactile input layer 360 installed on a sealed input surface 361 of a base chassis of the information handling system. For example, touch input may be received on a removable tactile input layer 360 situated to either side of a trackpad thereon or even on a sealed input surface 361 without any removable tactile input layer 360 installed in some embodiments.

A touchless gesture input mode capacitive change threshold value is also set for operation of a capacitive sensor driver 366 by a capacitive sensor microprocessor 367 as coordinated by a regional capacitive pad gesture sensing orchestration system 349*b* or a user input capacitive pad sensing illumination orchestration system 349*a* executing on a host microprocessor 368. User input received while in touchless gesture input mode may include, for example, a user gesturing with a hand or portion thereof above the surface of the removable tactile input layer 360 when the chassis is in an open position, or above the lid of the chassis of the information handling system is in a closed position.

In embodiments herein, a host microprocessor 368 executing machine readable code instructions of a regional capacitive pad gesture sensing orchestration system 349*b* may determine a grouping size of plural capacitive sensor pads 341*a* to 341*n* formed into subgroup capacitive change sensing regions across the capacitive pads layer 363. A first sized group of plural capacitive sensor pads 341*a* to 341*n* may be designated by the regional capacitive pad gesture sensing orchestration system 349*b* for a touch input mode to reduce latency of detecting user touch input, such as swipe movements across plural capacitive change sensing regions, as well as increase range of the capacitive field reach with the group of plural capacitive sensor pads 341*a* to 341*n* in the capacitive change sensing region. A second sized group of plural capacitive sensor pads 341*a* to 341*n*, larger than the first sized group, may be designated by the regional capacitive pad gesture sensing orchestration system 349*b* for a touchless input mode to also reduce latency of detecting user touchless gesture inputs above a removable tactile input layer 360 across plural capacitive change sensing regions, as well as increase range of the capacitive field reach with the group of plural capacitive sensor pads 341*a* to 341*n* in the capacitive change sensing region to reach above the removable tactile input layer 360. In such a way, capacitive sensing may be adjusted as tailored for improved detection of user touch input versus touchless gesture inputs depending on the user touch input mode or the touchless gesture input mode engaged by the host microprocessor. The regional capacitive pad gesture sensing orchestration system 349*b* may also coordinate with the execution of the capacitive pad sensing illumination orchestration system 349*a* for various user inputs depending on usage mode engaged in embodiments herein.

The host microprocessor 368 executing machine readable code instructions of a user input capacitive pad sensing illumination orchestration system 349*a* in an embodiment may provide visual feedback interactive illumination of user input received at capacitive sensor pads 341*a* to 341*n* in the form of light emitting diode (LED) 376*a* to 376*n* illumination beneath the removable tactile input layer 360 at the location of detected user input and in a color or intensity level associated with the currently detected usage input mode. Usage input modes may be selected from the key press input mode, the touch input mode, and the touchless gesture input mode in various embodiments herein. More specifically, a user input detected as a change in capacitance at the capacitive pad sensor 341*a* may trigger the host microprocessor 368 executing machine readable code instructions of a user input capacitive pad sensing illumination orchestration system 349*a* to instruct micro or mini LED 376*a* to emit light at a color or intensity level associated with the currently detected usage input mode to indicate a status of engagement of that currently detected usage input mode. In another example, a user input detected as a change in capacitance at the capacitive sensor pad 341*a* to 341*n* or across a plurality of those capacitive sensor pads may trigger the host microprocessor 368 executing machine readable code instructions of a user input capacitive pad sensing illumination orchestration system 349*a* to instruct micro or mini LED 376*n* to emit light at a color or intensity level for guidance interactive illumination on location, direction, or status of functional inputs to IO devices, software, or firmware on the information handling system and also associated with the currently detected usage input mode in embodiments herein.

In an embodiment, a manufacturer may set a key press input mode capacitive change threshold value defining a change in capacitance detectable at a capacitive pad sensor 341*a* or 341*n* sufficient to trigger a key press input mode for sensing user key press input on the removable tactile input layer 360. The manufacturer in an embodiment may further set a touchless gesture input mode capacitive change threshold value that is less than the key press input mode capacitive change threshold value defining a change in capacitance detectable at a capacitive pad sensor 341*a* or 341*n* sufficient to trigger a touchless gesture input mode for sensing user input via a hand or finger gesture above the removable tactile input layer 360. Still further, a manufacturer may set a touch input mode capacitive change threshold value between the key press input mode capacitive change threshold value and the touchless gesture input mode capacitive change threshold value or a range of changes in capacitance detectable at a capacitive pad sensor sufficient to trigger a touch input mode for sensing user input via touch contact across the surface of the removable tactile input layer 360 that does not include downward force on the keys 395. Each of these usage input modes may also be associated with a status-specific color or range of light intensity for emission of light at one or more LEDs 376*a* to 376*n* as user input is detected at capacitive sensor pads 341*a* to 341*n*, respectively, disposed above those LEDs 376*a* to 376*n* (e.g., with key press input mode being associated with a brighter light, touchless gesture input being associated with a dimmer light, and user touch input being associated with a medium light intensity).

The host microprocessor 368 in an embodiment may execute machine readable code instructions of the user input capacitive pad sensing illumination orchestration system 349*a* to orchestrate emission of light via LEDs 376*a* to 376*n* situated beneath each capacitive pad sensor (e.g., 341*a* to 341*n*, respectively) at which capacitive changes meeting the key press input mode capacitive change threshold value are sensed at the color associated with the key press mode. This may provide visual user feedback for user key press input in the form of status illumination as it is identified across the capacitive pads layer 363 and the removable tactile input layer 360 or at each key 395 disposed above a given capacitive sensor pads 341*a* to 341*n*. In another embodiment in which the current usage input mode is the touch input mode, the host microprocessor 368 may execute machine readable code instructions to orchestrate emission of light at a second color or light intensity associated with the touch input mode at LEDs 376*a* to 376*n* situated beneath each capacitive sensor pad 341*a* to 341*n*, respectively, at which capacitive changes within the user touch input capacitive change threshold range are sensed, to indicate user touch input mode status or to interactively illuminate user touch input as it is identified to provide user feedback illuminating the points along the removable tactile input layer 360 at which user touch input is being actively detected. In still other embodiments in which the current usage input mode is the touchless gesture input mode, the host microprocessor 368 may execute machine readable code instructions to orchestrate emission of light at a third color or light intensity level associated with the touchless gesture input mode at LEDs 376*a* to 376*n* situated beneath each capacitive sensor pads 341*a* to 341*n*, respectively, at which capacitive changes falling below the touchless gesture input maximum capacitive change threshold value are sensed. The interactive illumination with LEDs 376*a* to 376*n* operate via the machine readable code instructions to indicate user touchless gesture input mode status or to interactively illuminate user touchless gesture input over a removable tactile input layer 360 as it is identified to provide user feedback illuminating the points along the removable tactile input layer 360 at which user touchless gesture input is being actively detected. In still other embodiments, the host microprocessor 368 may execute machine readable code instructions to orchestrate emission of light via one or more side-firing micro or mini LEDs 377 and through one or more wave guide layer 378 that refract the light at an angle upward through various portions of the removable tactile input layer 360 to emit light across the regions or the entire surface of the removable tactile input layer 360 in some embodiments. The one or more side-firing micro or mini LEDs 377 and wave guide layers 378 may operate similarly to interactive illumination described above for the micro or mini LEDs 376*a* to 376*n* mounted on or in the keyboard sensing hardware structure flexible PCB 384 or other membrane or circuit board based on user inputs actively sensed by one or more capacitive sensor pads 341*a* to 341*n*.

In other aspects of an embodiment, pre-touch illumination may be enabled, such as, for example, by a user via a graphical user interface (GUI) of the user input capacitive pad sensing illumination orchestration system 349*a*. In pre-touch illumination mode, the host microprocessor 368 operating in a touchless gesture input mode may execute machine readable code instructions of the user input capacitive pad sensing illumination orchestration system 349*a* to instruct emission of light via LEDs 376*a* to 376*n* situated beneath capacitive sensor pads 341*a* to 341*n*, respectively, sensing capacitive change levels meeting a pre-touch illumination capacitive change threshold value while approaching a touch input capacitive change threshold value prior to the user making contact with a finger or portion of a hand at the removable tactile input layer 360. For example, the host microprocessor 368 may execute machine readable code instructions of a user input capacitive pad sensing illumination orchestration system 349*a* to set a pre-touch illumination capacitive change threshold value for the touch input mode that is a percentage value, such as ten percent for example, lower than the minimum touch gesture input mode capacitive change threshold value to trigger illumination of keys prior to the user touching the removable tactile input layer when a capacitive change that is a percentage value, such as ten percent below the touch input mode capacitive change threshold is detected. A fixed amount of capacitive change level below the touch input mode capacitive change threshold may be used instead of a percentage in some embodiments. These are only examples of the pre-touch illumination capacitive change threshold values.

In an embodiment in which the host microprocessor 368 is operating in the pre-touch illumination mode, the host microprocessor 368 may then instruct light emissions of varying colors and intensities from LEDs 376*a* to 376*n* situated beneath the capacitive sensor pads 341*a* to 341*n*, respectively, according to the current usage input mode prior to the user making contact with the removable tactile input layer 360. For example, if the touchless gesture input mode were associated with the color red or a low intensity light and the touch input mode were associated with the color yellow or a relatively higher intensity light, the host microprocessor 368 may execute machine readable code instructions of the user input capacitive pad sensing illumination orchestration system 349*a* to orchestrate emission of light via LEDs 376*a* to 376*n* when sensing capacitive changes exceeding the pre-touch illumination threshold value that moves from the color red, to the color orange, then to the color yellow or from the lower intensity light to the higher intensity light as the sensed capacitive change value from a user input moves from touchless gesture input level, through the pre-touch illumination threshold value, to the touch input mode capacitive change threshold for detecting a user's touch input. In other embodiments, the transition from touchless gesture input mode at one light intensity level, may reach a pre-touch illumination mode at a second level of light intensity that increases (or decreases) as a user's finger gets closer to touching the removable tactile input layer, and another level of light intensity for the touch input mode when the user touches the removable tactile input layer. This may provide visual feedback to the user that the usage input mode is shifting from the touchless gesture input mode to the touch input mode as the user approaches the removable tactile input layer 360.

In other embodiments, the visual feedback interactive illumination for a touchless gesture mode or a touch input mode may transition light intensity or color based on the gestures received from one light intensity level or color to another as a touchless gesture is received or a hand or finger distance from the removable tactile input layer 360 gets further or closer. For example, in a touchless gesture input mode as a user's hand gets further from the surface of the tactile input layer 360 the LED light emitted for interactive illumination may get dimmer or extinguish to indicate a distance at which the user's touchless gesture input may not be sensed or is very weakly sensed. In other embodiments, a plural series of gestures or touches may be used and reflected in various LED light colors or light intensities to indicate the touchless gesture inputs or user touch inputs are received or to indicate a computer device control command has been received for an I/O device or for software or firmware executing on the information handling system. In such a way, the host microprocessor 368 may execute machine readable code instructions of the user input capacitive pad sensing illumination orchestration system 349*a* to adjustably illuminate capacitive sensing pads 341*a* to 341*n* beneath a removable tactile input layer 360 based upon current usage input mode and user preferences as user touch or gesture input as detected at the capacitive sensing pads 341*a* to 341*n* to provide visual feedback to a user of a current usage input mode and received user input.

Figure 4:
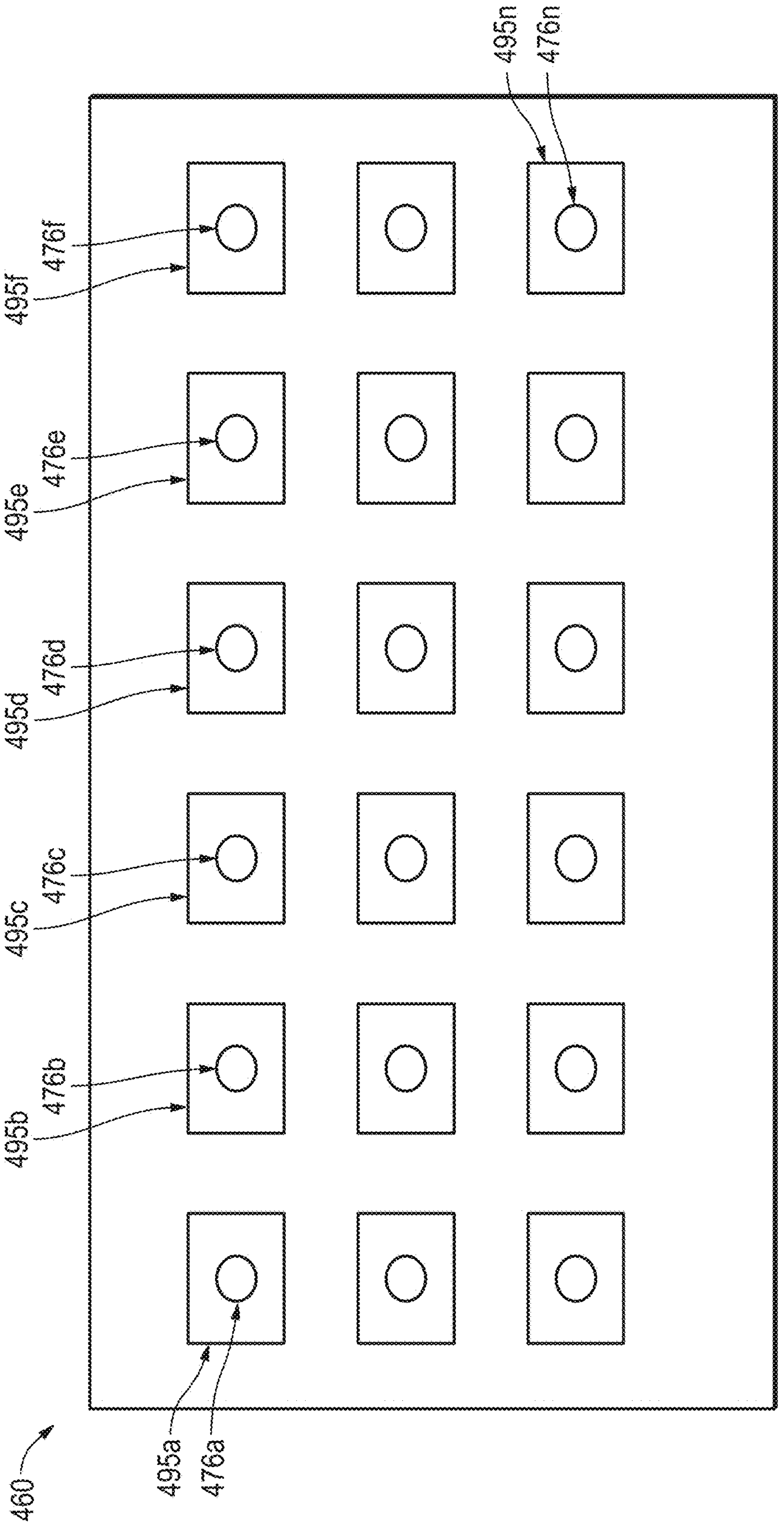
FIG. 4 is a graphical diagram illustrating a top view of a plurality of light emitting diodes (LEDs) disposed with a plurality of capacitive sensor pads of a keyboard sensing hardware structure formed underneath a sealed input surface to provide user interaction illumination for a removable tactile input layer according to an embodiment of the present disclosure.

FIG. 4 is a graphical diagram illustrating a top view of a plurality of LEDs of an LED illumination layer, each disposed beneath one of a plurality of capacitive sensor pads of a capacitive pads layer beneath a removable tactile input layer to provide visual feedback interactive illumination to a user of a current usage input mode and received user input according to an embodiment of the present disclosure. As described herein, a host microprocessor executing machine readable code instructions of a user input capacitive pad sensing illumination orchestration system in an embodiments may provide user interaction illumination as visual feedback for user input received at capacitive sensor pads in the form of light emitting diode (LED) 476*a* to 476*n* illumination co-located with the keyboard sensing hardware structure formed beneath sealed input surface 460 of the base chassis. The LEDs 476*a* to 476*n* may be micro or mini LEDs co-located in the keyboard sensing hardware structure under or adjacent to capacitive sensor pads of the capacitive pads layer in embodiments herein. For example, the color, intensity level, location or movement direction of illumination from LEDs 476*a* to 476*n* co-located in the keyboard sensing hardware structure specific to the currently detected usage input mode, which may include the key press input mode, the touch input mode, and the touchless gesture input mode, at the location of detected user input at the removable tactile input layer 460. User interactive illumination may be viewable through the removable tactile layer 460 installed on the sealed input surface to provide feedback to a user indicating detection or guidance for user touch inputs, user touchless gesture inputs, or status for keypress inputs depending on usage mode operating for capacitive sensor pads of the keyboard sensing hardware structure in an embodiment.

A host microprocessor (not shown) in an embodiment may execute machine readable code instructions of a user input capacitive pad sensing illumination orchestration system to orchestrate emission of light via LEDs 476*a*, 476*b*, 476*c*, 476*d*, 476*e*, 476*f* to 476*n* situated beneath each key 495*a*, 495*b*, 495*c*, 495*d*, 495*e*, 495*f*, to 495*n* at which capacitive sensor pads disposed thereunder detect capacitive changes meeting the key press input mode capacitive change threshold value at the first color or intensity associated with the key press mode. This may provide visual user feedback for user key press input in the form of illumination, via LEDs 476*a*, 476*b*, 476*c*, 476*d*, 476*e*, 476*f* to 476*n*, of the status of the user keypress input being engaged as it is identified at each key 495*a*, 495*b*, 495*c*, 495*d*, 495*e*, 495*f*, to 495*n* disposed above or adjacent to a given capacitive pad sensor. In another embodiment in which the current usage input mode is the touch input mode, the host microprocessor may execute machine readable code instructions to orchestrate emission of light at a second color or intensity associated with the touch input mode at LEDs 476*a*, 476*b*, 476*c*, 476*d*, 476*e*, 476*f* to 476*n* situated beneath each key 495*a*, 495*b*, 495*c*, 495*d*, 495*e*, 495*f*, to 495*n*, respectively, at which capacitive sensor pads disposed thereunder sense capacitive changes within the touchless input capacitive change threshold range, to indicate that user touch input mode is engaged or to illuminate user touch input as it is received, such as location/motion of a user touch, to provide user feedback illuminating the points along the removable tactile input layer 460 at which user touch input in the form of user touch but not downward pressure on the keys 495*a*, 495*b*, 495*c*, 495*d*, 495*e*, 495*f*, to 495*n* has been detected. In still other embodiments in which the current usage input mode is the touchless gesture input mode, the host microprocessor may execute machine readable code instructions to orchestrate emission of light at a third color or intensity associated with the touchless gesture input mode at LEDs 476*a*, 476*b*, 476*c*, 476*d*, 476*e*, 476*f* to 476*n* situated beneath each key 495*a*, 495*b*, 495*c*, 495*d*, 495*e*, 495*f*, to 495*n* at which capacitive sensor pads disposed thereunder sense capacitive changes falling within the touchless gesture input capacitive change threshold value range. The user interactive illumination may indicate that user touchless gesture input mode is engaged or to illuminate user touchless gesture input as it is received, such as location/motion of a user touchless gesture, to provide user feedback illuminating the points along the removable tactile input layer 460 at which user touchless input with emission of light at a third color or intensity associated with the touchless gesture input mode at LEDs 476*a*, 476*b*, 476*c*, 476*d*, 476*e*, 476*f* to 476*n* in embodiments herein.

Figure 5:
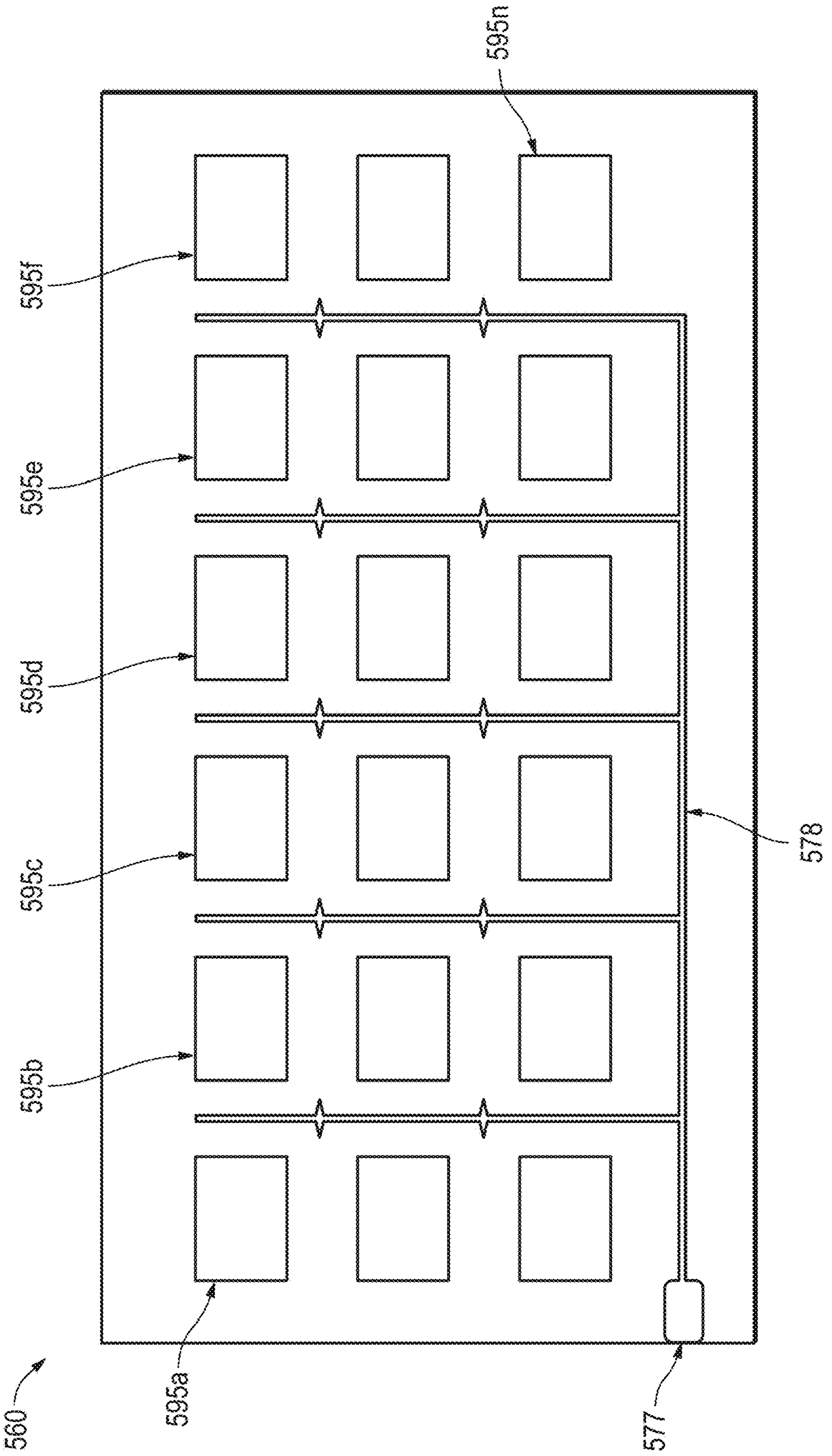
FIG. 5 is a graphical diagram illustrating a top view of a side-firing LED and waveguide layer disposed with a plurality of capacitive sensor pads of a keyboard sensing hardware structure formed underneath a sealed input surface to provide user interaction illumination for a removable tactile input layer according to an embodiment of the present disclosure.

FIG. 5 is a graphical diagram illustrating a top view of a side-firing micro or mini LED and waveguide layer disposed beneath or alongside a plurality of capacitive sensor pads in a keyboard sensing hardware structure and below a removable tactile input layer to provide visual feedback to a user of a current usage input mode according to an embodiment of the present disclosure. As described herein, the host microprocessor in an embodiment may execute machine readable code instructions of the user input capacitive pad sensing illumination orchestration system to orchestrate emission of light via the LEDs situated beneath or along each capacitive pad sensor to provide visual user feedback for user key press input, user touch input, or touchless gesture input in the form of user interactive illumination as it is identified at each key location disposed above a given capacitive pad sensor. In embodiments herein, the host microprocessor may execute machine readable code instructions to orchestrate emission of light via a side-firing micro or mini LED 577 and through a wave guide layer 578 that refracts the light at an angle upward through the removable tactile input layer 560 to emit light across the entire surface of the removable tactile input layer 560, rather than only at key locations where user touch input is actively sensed by one or more capacitive sensor pads. The emission of light via the side-firing micro or mini LED 577 in such an embodiment may include emission of light of a specific color or intensity associated with the current usage input mode, including the key press input mode, the touch input mode, or the touchless gesture input mode, as described herein. In other embodiments, the emission of light via the side-firing micro or mini LED 577 via light guide locations across the removable tactile input layer may include moving emission of light of a specific color or intensity associated with the current usage input mode and as a guide user interactive illumination form movement or location of received user touch inputs or touchless gesture inputs in the touch input mode or the touchless gesture input mode respectively, as described herein. Further, when operating in pre-touch illumination mode, the side-firing micro or mini LED 577 may emit light at a first color or intensity when capacitive changes meeting a pre-touch illumination threshold value for the key press input mode or the touch input mode are detected as being approached, and at a second color or intensity as the capacitive changes detected reach the user touch input mode minimum threshold value or the key press input mode minimum threshold value, as described herein, to indicate via light emitted across the entire removable tactile input layer 560 that the usage input mode is shifting as the user's finger or hand approaches the surface of the removable tactile input layer 560.

Figure 6:
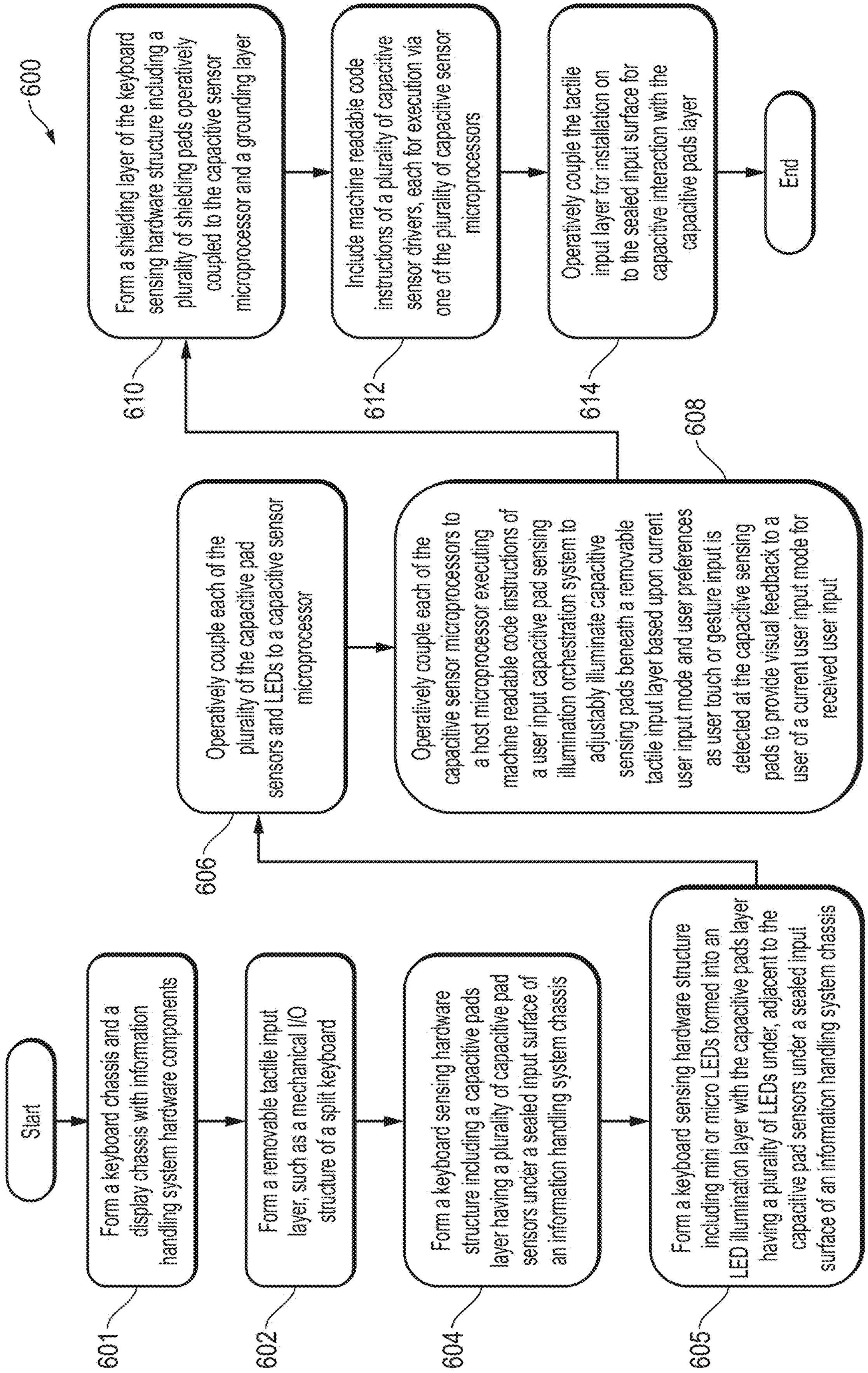
FIG. 6 is a flow diagram showing a method of manufacturing a split keyboard structure for a keyboard chassis of an information handling system that includes a removable tactile input layer and a separate sealed input surface with a keyboard sensing hardware structure formed thereunder to capacitively receive keyboard, touch and gesture input contactlessly and provide user interaction illumination according to an embodiment of the present disclosure.

FIG. 6 is a flow diagram showing a method 600 of manufacturing a split keyboard structure for an information handling system that includes a removable tactile input layer and a separate keyboard sensing hardware structure including a plurality of capacitive sensor pads in a capacitive pads layer with a grounding layer and an active shielding layer formed under a sealed input surface to receive keyboard input, touch input or gesture input contactlessly at capacitive sensor pads according to an embodiment of the present disclosure. The method may include similar manufacturing processes to form any of those split keyboard stack structures of hardware layers as described in connection with embodiments above that each include a bifurcated or split keyboard stack. The method of assembly for the split keyboard stack of structure layers comprises the keyboard sensing hardware structure formed under a sealed input surface of a keyboard chassis or base chassis of the information handling system with a capacitive pads layer, an active shielding layer, and a grounding layer in various embodiments.

At block 601, the method 600 may include forming a base chassis or housing of the information handling system such as a tray or other structure and installing a motherboard with hardware processors, memory devices, a PMU, and other hardware components of the information handling system described herein. As described herein, the information handling system may be a laptop-type information handling system that includes a base chassis portion operatively coupled to a display chassis portion via a hinge. In embodiments herein, information handling system hardware components, such as those described in connection with FIG. 1 and including an information handling system hardware mainboard or other processor boards that may include various hardware processors, memory, power systems, network interface or wireless interface devices, among others, may be installed within the base chassis of the information handling system. In an embodiment, the other information handling system hardware devices may also include fans, port systems, and a battery that may be sized to fit within this base chassis portion with the motherboard. In some embodiments, this step of including information handling system hardware components in the base chassis may occur after formation of the keyboard sensing hardware structure layers under the sealed input surface of the keyboard chassis.

At block 602, the method 600 includes forming a removable tactile input layer of a keyboard. The removable tactile input layer may be that layer that a user interacts with to provide input to the information handling system such as keyboard keypress input, touch input on keyboard keys or on a touch surface, or gesture input detected above the removable tactile input layer in various embodiments herein. This removable tactile input layer may include only mechanical elements such as mechanical keys that provide tactile response to the user when the mechanical keys are pressed. In a specific example, the removable tactile input layer may include a keyboard key and keyboard key post that is operatively coupled to a rubber dome or popple. In this example embodiment, instead of the rubber dome having a switch or activating a switch on a PCB, the rubber dome may be used to help provide tactile feedback to the user. However, actuation of such mechanical keyboard keys of the removable tactile input layer may be contactlessly sensed by capacitive sensor pads, that may be subgrouped, of the keyboard sensing hardware structure formed under a sealed input surface of a chassis of the information handling system as described below. In an example embodiment, the removable tactile input layer may also include scissor or butterfly arms that also provide tactile feedback to the user while facilitating the recoil of the keycap upwards. However, the removable tactile input layer does not include any electrical elements that are used to receive electrical signals as the user presses the keyboard keys. Therefore, in the embodiments herein, the removable tactile input layer does not include a PCB layer, a flexible PCB layer, or other electrical components that other keyboards may use to detect the press of a keyboard key by the user. In embodiments herein, the removable tactile input layer is formed of mechanical keyboard keys in a set and arrangement with mechanical components such as keycaps, popples, scissor structures, and/or may include one or more touch surfaces or touchable keyboard keys.

The removable tactile input layer may be formed as a unit structure layer of mechanical components having a plurality of keyboard keys and/or one or more touch input areas or structures in embodiments herein. The removable tactile input layer may be a removable tactile input layer keyboard structure for example with a preselected arrangement of keyboard keys and a removable tactile input layer support structure made of plastic or other appropriate material for supporting the key popples, any scissor structures, keycaps, touchpads or touch areas, or the like without electrical components in various embodiments herein. In one embodiment, the removable tactile input layer includes a removable tactile input layer support structure, such as a tray or frame made of plastic or other suitable material, that includes edges or sides with an edge, lip, groove, slot, or interface structure along a side or bottom surface of the removable tactile input layer support structure to provide for an interference fit with a reciprocal structure to operably couple the removable tactile input layer to the sealed input surface of the chassis, such as a base chassis, of the information handling system. In another embodiment, the removable tactile input layer includes a removable tactile input layer support structure, such as a tray or frame made of plastic or other suitable material, that includes a latch or a latch receiver along one or more sides of the removable tactile input layer support structure edge, edges, or bottom surface to provide for latching structure interface with a reciprocal structure to operably couple the removable tactile input layer to the sealed input surface of the chassis, such as a base chassis, of the information handling system. In yet another embodiment, the removable tactile input layer includes a removable tactile input layer support structure, such as a tray or frame made of plastic or other suitable material, that includes a magnet or magnetic structure along a side or bottom surface of the removable tactile input layer support structure to provide for an magnetic interaction with a reciprocal magnet or magnetic structure to operably couple the removable tactile input layer to the sealed input surface of the chassis, such as a base chassis, of the information handling system. In this way, any of a plurality of removable tactile input layers formed according to embodiments herein may receive keyboard keypress inputs, touch inputs, or gesture inputs above the sealed input surface of the chassis of the information handling system operating as a mechanical removable tactile input layer that is contactlessly detected by a keyboard sensing hardware structure formed under a sealed input surface of the information handling system chassis described in more detail below.

At block 604, the method 600 further includes forming a keyboard sensing hardware structure including a capacitive pads layer that includes a plurality of capacitive sensor pads. The keyboard sensing hardware structure is formed under, as part of or adhered to, the sealed input surface of the chassis of an information handling system in various embodiments. The capacitive pads layer may include a plurality of capacitive sensor pads that can sense changes in capacitance from user interaction on or above the removable tactile input layer proximate and above the sealed input surface of the chassis. These capacitive sensor pads are arranged at locations under the sealed input surface of the chassis to detect varying levels of capacitive changes caused by a user's fingers at locations across the sealed input surface for touch or gesture inputs. Further, these capacitive sensor pads are arranged to correspond under one or more keyboard keys of a removable tactile input layer keyboard structure to detect a capacitive change associated with a keypress actuation of one or more keyboard keys.

In an embodiment, the plurality of capacitive sensor pads may include patches of deposited carbon configured to vary an electric field in response to changes in nearby capacitance above the sealed input surface of the chasses at the location of the capacitive pad sensor. These carbon-based patches may be arranged in a sensor matrix and may be printed, sputtered, or otherwise deposited on a non-conductive substrate such as an ABS polymer surface, a flexible PCB, or other PCB. In another embodiment, the ABS polymer surface may be the underside of the sealed input surface of the base chassis of the information handling system in an embodiment. In an embodiment, the array of deposited carbon patches may be arranged such that each key of the removable tactile input layer aligns vertically with one or more deposited carbon patch.

block 605, the method 600 further includes forming the keyboard sensing hardware structure including a LED illumination layer that includes a plurality of LEDs associated with each of or some portion of the capacitive sensor pads or across the capacitive pads layer as described above in FIGS. 4 and 5. The keyboard sensing hardware structure is formed under, as part of or adhered to, the sealed input surface of the base chassis of an information handling system, where the sealed input surface is made of a light transmissive material or has light guide structures formed therein in various embodiments. The LED illumination layer that includes a plurality of LEDs that are coordinated with plurality of capacitive sensor pads of the capacitive pads layer that can sense changes in capacitance from user interaction on or above the removable tactile input layer proximate and above the sealed input surface of the base chassis. A host processor executing machine readable code instructions of a user input capacitive pad sensing illumination orchestration system may detect capacitive change levels, determine a usage mode engaged or detect user inputs from one or more capacitive sensor microprocessors and capacitive sensor pads and coordinate instruction of illumination of the LEDs in the LED illumination layer. These LEDs in the LED illumination layer may be associated with locations of the capacitive sensor pads arranged at locations under the sealed input surface of the base chassis to indicate with user interactive illumination the detection varying levels of capacitive changes caused by a user's fingers at locations across the sealed input surface and a removable tactile input layer for user touch inputs or touchless gesture inputs or motion of user touch inputs or touchless gesture inputs. Further, the LED layer may be coordinated capacitive sensor pads that are arranged to correspond under one or more keyboard keys of keyboard structure to detect a capacitive change and coordinate user interactive illumination associated with a keypress actuation of one or more keyboard keys for a keypress input mode.

In an embodiment, the plurality of LEDs may be micro-LEDs under or adjacent to the capacitive sensor pads arranged in a sensor matrix and may be formed on or into a non-conductive substrate such as an ABS polymer surface, a flexible PCB, or other PCB of the keyboard sensing hardware structure. In an embodiment, the LEDs associated with the array of deposited carbon patches may be arranged such that each key of the removable tactile input layer aligns vertically with one or more deposited carbon patch and an LED.

At block 606, each of the plurality of the capacitive sensor pads and any corresponding LEDs within one or more of the plurality of capacitive change sensing regions in an embodiment may be operatively coupled to one of a plurality of capacitive sensor microcontrollers and a power source. The capacitive sensor pads and any associated LEDs may be operatively coupled to one of a plurality of capacitive sensor microcontrollers via copper, silver, or carbon traces formed on an under surface of the ABS polymer sealed input surface or on a surface such as a PCB or a flexible PCB, or some combination in embodiments described herein. The capacitive sensor microcontrollers may be formed on a PCB or a flexible PCB in embodiments herein. The capacitive sensor microcontrollers execute machine readable code instructions of capacitive sensor drivers and may be operatively coupled to a hardware processor of the information handling system for provision of user I/O inputs such as keypress inputs, touch inputs, or touchless gesture inputs to the hardware processor executing machine readable code instructions of one or more software or firmware applications. Execution of the machine readable code instructions of the user input capacitive pad sensing illumination orchestration system may operate via the host microprocessor or capacitive sensor microprocessors to provide user interactive illumination via the corresponding LEDs across a capacitive pads layer according to various embodiments of the present disclosure. It is also appreciated that other types of traces may be formed to operatively couple the carbon pads to the capacitive sensor drivers such as copper traces, silver traces, or indium tin oxide (ITO) within a flexible PCB or under a sealed input surface of the base chassis that allow each of the carbon pads to conduct change in capacitance signals to the capacitive sensor microcontrollers for the capacitive sensor drivers or to provide user interactive illumination via any of the corresponding LEDs. The capacitive sensor drivers may determine detected capacitive changes are indicative of a user's keypress input, user's touch, or a touchless gesture at or near the keys or other input surfaces of the removable tactile input layer portion of the split keyboard structure above the sealed input surface of the chassis of the information handling system.

At block 608 in an embodiment, each of the capacitive sensor microprocessors may be operatively coupled to a host microprocessor executing machine readable code instructions of a user input capacitive pad sensing illumination orchestration system to adjustably illuminate capacitive sensing pads beneath a removable tactile input layer based upon current usage input mode and user preferences as user touch or gesture input as detected at the capacitive sensing pads to provide visual feedback to a user of a current usage input mode and received user input. For example, in an embodiment described with respect to FIG. 3, a plurality of capacitive sensor microprocessors, such as 367 may be included in an embodiment, each operatively coupled to and receiving user input from a plurality of capacitive sensor pads 341*a* to 341*n* within the capacitive pads layer 363 of the split keyboard structure 362. The host microprocessor 368 executing machine readable code instructions of a user input capacitive pad sensing illumination orchestration system 349*a* in an embodiment may provide visual feedback of user input received at capacitive sensor pads 341*a* to 341*n* in the form of light emitting diode (LED) 376*a* to 376*n* illumination beneath the removable tactile input layer 360 at the location of detected user input and in a color or intensity level associated with the currently detected usage input mode, which may include the key press input mode, the touch input mode, and the touchless gesture input mode.

The method 600 further includes forming an active shielding layer that includes a plurality of shielding pads at block 610 as part of the keyboard sensing hardware structure that is formed under, as part of or adhered to, the sealed input surface of the chassis of an information handling system. The active shielding layer may include a plurality of shielding pads that are formed vertically below each of the capacitive sensor pads within the active shielding layer, such as on a PCB or on a flexible PCB. Each of the shielding pads of the active shielding layer may act to shield the plurality of capacitive sensor pads within the capacitive pads layer from a grounding layer. The grounding layer formed below on the keyboard sensing hardware structure may provide EMI protection from or for hardware components in the base chassis of the information handling system as well as a grounding source for the split keyboard stack structure. The grounding layer may cause parasitic capacitive grounding of the capacitive sensor pads without the active shielding layer that may otherwise disrupt the operation of the plurality of capacitive sensor pads of the capacitive pads layer by reducing their capacitive fields to very low levels. The close location of the grounding layer needed for a thin keyboard sensing hardware structure may impact operation or ground out the capacitive fields of these capacitive sensor pads such that they have no reach to detect various user inputs, especially user touch inputs and touchless gesture inputs. Thus, active shielding pads of the active shielding layer are formed between the grounding layer and the capacitive sensor pads in the keyboard sensing hardware structure formed under the sealed input surface of the chassis of an information handling system in embodiments herein to force the capacitive fields of the capacitive sensor pads to go around the active shielding pads to reach the grounding source of the grounding layer.

In an embodiment, the shielding pads of the active shielding layer are active shielding pads operatively coupled to the capacitive sensor microprocessor. These active shielding pads may be driven by the capacitive sensor microprocessor using the same voltage as the plurality of capacitive sensor pads within the capacitive pads layer thereby shielding or avoiding grounding of the capacitive sensing pads by the nearby ground layer for EMI protection of the keyboard or other I/O structures. The active shielding pads are also, each, operatively coupled to the capacitive sensor microprocessor and a power source, such as a PMU, in the keyboard sensing hardware structure formed under the sealed input surface of the chassis of an information handling system when installed. In this way, the active shielding pads reduce parasitic capacitance between the corresponding plurality of capacitive sensor pads of the capacitive pads layer and the grounding layer placed below the active shielding layer. These active shielding pads of the active shielding layer improve signal-to-noise ratio and extends the sensing range of the plurality of capacitive sensor pads of the capacitive pads layer such as for detecting lower capacitive change levels, for example, that may be associated with a removable tactile input layer positioned further from the corresponding capacitive sensor pads or for touch inputs on or touchless gesture inputs above the removable tactile input layer of the split keyboard structures in embodiments herein. Indeed, in an embodiment, the active shielding pads allows a user to provide input such as gesture input even when the user is not in physical contact with any of the keys of a removable tactile input layer detected as a capacitive change from the capacitive sensor pads of the capacitive pads layer. This is because the capacitive sense capabilities of the capacitive sensor pads have capacitive fields extended a distance above the surface of the removable tactile input layer due to the inclusion of the shielding pads of the active shielding layer which are not subject to parasitic grounding of the grounding layer.

At block 612, the method 600 includes providing for firmware machine readable code instructions of a capacitive sensor driver to each of the plurality of capacitive sensor microcontrollers for receiving capacitive difference level changes from the operatively coupled network of the plurality of capacitive sensor pads to determine the input as a keypress input of a keyboard key, as a touch input on the keyboard keys or other I/O structure, or as a touchless gesture input above a removable tactile input layer. The machine readable code instructions of the capacitive sensor drivers execute on the capacitive sensor microprocessors to process various types of user input via the removable tactile input layer, as characterized by one or more detected capacitive change levels and characterized by location or movement across locations in the network of capacitive sensor pads, as I/O input from the user for the hardware processor of the information handling system.

As described herein, the capacitive sensor drivers may be executed by the capacitive sensor microprocessors to detect and determine which of the plurality of keys on the removable tactile input layer, associated with particular capacitive sensor pads below the sealed input surface of the chassis, have been pressed and detected at each of the plurality of capacitive sensor pads. If the detected capacitive change is at a first capacitive change level, the capacitive sensor driver may relay these keypress inputs for particular keyboard keys from the capacitive sensor microprocessors to the hardware processor for processing of keystrokes as input to software or firmware applications executing on the information handling system. Similarly, a second level of capacitive change detected at one or more capacitive sensor pads may indicate a touch input on keys or other I/O structures of the removable tactile input layer above the sealed input surface of the chassis such that the capacitive sensor microprocessors executing the capacitive sensor drivers may determine a touch or touch gesture of the user in some embodiments. In an example embodiment, the second level of capacitive change may be lower or less than the first level of capacitive change associated with a keypress. In yet another embodiments, a third level of capacitive change may be detected at one or more capacitive sensor pads that may indicate a touchless gesture input above any I/O structures of a removable tactile input layer. This third level of capacitive change detected may be lower than the second level of capacitive change detected by the capacitive sensor pads and the capacitive sensor microprocessors in embodiments herein.

In embodiments herein, the capacitive sensor drivers may be executed by the capacitive sensor microprocessors to detect and determine capacitive change levels corresponding to user input types is coordinated with user interactive illumination via a host microprocessor executing machine readable code instructions of the user input capacitive pad sensing illumination orchestration system. The machine readable code instructions of the user input capacitive pad sensing illumination orchestration system are loaded for execution by the host microprocessor for coordination with one or more capacitive sensor microprocessors to control power to LEDs corresponding to the capacitive sensor pads in the keyboard sensing hardware structure of the split keyboard stack structure.

In an embodiment at block 614, the split-keyboard structure of embodiments herein may be completed by operatively coupling the removable tactile input layer on to sealed input surface, which may be removed and replaced by another removable tactile input layer for use with the keyboard sensing hardware structure as formed under the sealed input surface of the base chassis of an information handling system. This removable tactile input layer may be installed over the sealed input surface via an interference fit system, magnetic interface structures, mechanical latch or other structure such that the removable tactile input layer is detachable and replaceable with a new or different removable tactile input layer for use with the keyboard sensing hardware structure formed under the sealed input surface of the chassis. The removable tactile input layer is replaceable as a mechanical-only portion of the split-keyboard structure.

In an embodiment, the removable tactile input layer includes a removable tactile input layer support structure, such as a tray or frame made of plastic or other suitable material, that includes edges or sides with an edge, lip, groove, slot, or interface structure along a side or bottom surface of the removable tactile input layer support structure to provide for an interference fit with a reciprocal structure to operably couple the removable tactile input layer to the sealed input surface of the chassis, such as a base chassis, of the information handling system as described. The removable tactile input layer is installed by an interference fit into a reciprocal structure of the sealed input surface of the chassis of the information handling system. In another embodiment, the removable tactile input layer includes a removable tactile input layer support structure, such as a tray or frame made of plastic or other suitable material, that includes a latch or a latch receiver along one or more sides of the removable tactile input layer support structure edge, edges, or bottom surface to provide for latching structure interface with a reciprocal structure to operably couple the removable tactile input layer to the sealed input surface of the chassis, such as a base chassis, of the information handling system. The removable tactile input layer is installed via the latch or other fastener device into a reciprocal latch structure or fastener of the sealed input surface of the chassis of the information handling system. In yet another embodiment, the removable tactile input layer includes a removable tactile input layer support structure, such as a tray or frame made of plastic or other suitable material, that includes a magnet or magnetic structure along a side or bottom surface of the removable tactile input layer support structure to provide for a magnetic interaction with a reciprocal magnet or magnetic structure to operably couple the removable tactile input layer to the sealed input surface of the chassis, such as a base chassis, of the information handling system. The removable tactile input layer is installed via magnetic attachment between it and a reciprocal magnet or magnetic structure of the sealed input surface of the chassis of the information handling system. In yet another embodiment, the removable tactile input layer may be operatively coupled to the sealed input surface using an adhesive layer. This adhesive layer may include any type of glue, tape, or other adhesive that may, at least temporarily, adhere a bottom surface of the removable tactile input layer to a top surface of the sealed input surface of the chassis of the information handling system.

In this way, any of a plurality of removable tactile input layers formed according to embodiments herein may receive keyboard keypress inputs, touch inputs, or gesture inputs at a mechanical removable tactile input layer above the sealed input surface of the chassis of the information handling system operating that is contactlessly detected by a keyboard sensing hardware structure formed under a sealed input surface of the information handling system chassis of embodiments herein. Further, the user may receive user interactive illumination through the removable tactile input layer by host microprocessor executing machine readable code instructions of the user input capacitive pad sensing illumination orchestration system for status or guidance of user inputs in various usage input modes. At this point the method 600 may end with the split-keyboard structure of embodiments herein being formed in, for example, a base portion of a laptop-type information handling system.

Figure 7:
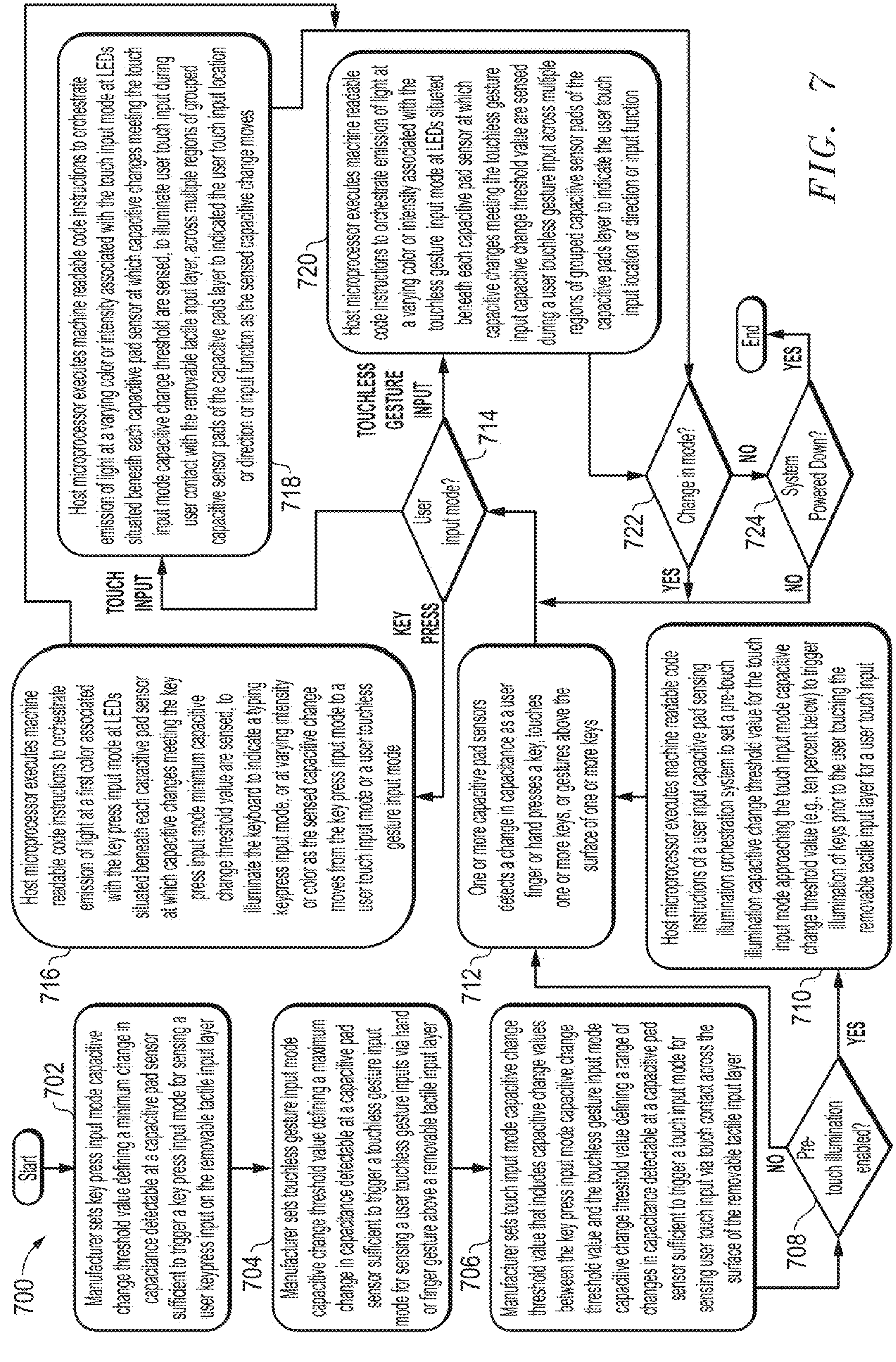
FIG. 7 is a flow diagram showing a method of executing machine readable code instructions for adjusting operation of capacitive sensing pads beneath a sealed input surface of a display chassis split keyboard structure and providing user interaction illumination to assist user inputs at or above a removable tactile input layer based upon current usage input mode according to an embodiment of the present disclosure.

FIG. 7 is a flow diagram showing a method 700 of adjustably illuminating capacitive sensing pads beneath a removable tactile input layer based upon current usage input mode and user preferences for user touch input or touchless gesture input as detected at the capacitive sensing pads to provide visual feedback interactive illumination to a user of a current usage input mode and received user input according to an embodiment of the present disclosure. As described herein, a host microprocessor executing machine readable code instructions of a user input capacitive pad sensing illumination orchestration system in embodiments herein may provide user interaction illumination as visual feedback for user input received at capacitive sensor pads in the form of light emitting diode (LED) illumination co-located with the keyboard sensing hardware structure formed beneath sealed input surface of the base chassis. For example, the color, intensity level, location or movement direction of illumination from LEDs co-located in the keyboard sensing hardware structure specific to the currently detected usage input mode, which may include the key press input mode, the touch input mode, and the touchless gesture input mode, for the location and movement of various capacitively detected user inputs at the removable tactile input layer. In an embodiment, a host microprocessor executing machine readable code instructions for a user input capacitive pad sensing illumination orchestration system may determine which of the usage input modes have been engaged and may generate an status illumination indicating that engaged usage input mode as well as user interactive illumination for ongoing received user inputs in that engaged usage input mode such as with an associated a color or range of light intensity or direction of light or color movement for various user inputs in each usage input mode.

At block 702 in an embodiment, a manufacturer may set a key press input mode capacitive change threshold value. This value in an embodiment may define a minimum change in capacitance detectable at a capacitive pad sensor to trigger a key press input mode for sensing a user key press input on the removable tactile input layer. For example, in an embodiment described with reference to FIG. 3, the key press input mode capacitive change threshold value may define a change in capacitance detectable from interaction of a capacitive field at capacitive pad sensor 341*a* that is sufficient to indicate that the user is making contact with and providing downward force on the key 395.

The manufacturer in an embodiment at block 704 may further set a touchless gesture input mode capacitive change threshold value. This value may be below the key press input mode capacitive change threshold value described at block 702 above and below a user touch input mode capacitive change threshold range discussed below in 706, for defining a change in capacitance detectable at a capacitive pad sensor to trigger a touchless gesture input mode for sensing user touchless gesture input via a hand or finger gesture above the removable tactile input layer. For example, the touchless gesture input mode capacitive change threshold value may define a change in capacitance detectable at capacitive pad sensor 341*a* that is sufficient to indicate that the user is gesturing with a hand or finger at a distance above the surface of the removable tactile input layer 360. This touchless gesture input mode capacitive change threshold value is set for operation of a capacitive sensor driver 366 by a capacitive sensor microprocessor 367 as coordinated by a regional capacitive pad gesture sensing orchestration system 349*b* for assessing capacitive change levels across grouped sets of capacitive sensor pads or a user input capacitive pad sensing illumination orchestration system 349*a* executing on a host microprocessor 368. User input received while in touchless gesture input mode may include, for example, a user gesturing with a hand or portion thereof above the surface of the removable tactile input layer when the chassis is in an open position, or above the lid of the chassis of the information handling system is in a closed position.

In another embodiment at block 706, a manufacturer may set a touch input mode capacitive change threshold value for defining a change in capacitance detectable at a capacitive pad sensor to trigger a touch input mode. In an embodiment, the touch input mode may allow for sensing user touch input via touch contact across the surface of the removable tactile input layer such as touch on the surface of keyboard keys, drawing or control surface or a palmrest surface of the removable tactile input layer. The touch input mode capacitive change threshold value in an embodiment may be between the key press input mode capacitive change threshold value and the touchless gesture input mode capacitive change threshold value, for example. User input received while in touch input mode may include, for example, a user drawing with a finger across a plurality of individual keys of the keyboard or across a portion of the top surface of a removable tactile input layer installed on a sealed input surface of a base chassis of the information handling system. For example, touch input may be received on a removable tactile input layer situated to either side of a trackpad thereon, across the sides or top around the keyboard, across keyboard keys, or even on a sealed input surface without any removable tactile input layer installed in some embodiments.

At block 708, it may be determined whether a pre-touch illumination mode has been enabled. As described herein, pre-touch illumination may be enabled, such as, for example, by a user via a graphical user interface (GUI) of the user input capacitive pad sensing illumination orchestration system. In pre-touch illumination mode, the host microprocessor operating in the touchless gesture input mode may execute machine readable code instructions of the user input capacitive pad sensing illumination orchestration system to instruct emission of light via LEDs situated beneath capacitive sensor pads sensing capacitive changes prior to the user making contact with a finger or portion of a hand at the removable tactile input layer for transition to a touch input mode.

If the pre-touch illumination mode has been enabled, the method may proceed to block 710 for setting of pre-touch illumination capacitive change threshold values for the pre-touch illumination mode for capacitive change levels that approach a touch input capacitive change threshold value range minimum to trigger illumination of one or more portions of the removable tactile input layer prior to the user making contact with the removable tactile input layer and transitioning to the touch input mode. This pre-touch illumination capacitive change threshold value for the pre-touch illumination mode may trigger from the keyboard sensing hardware structure operating in a touchless gesture input mode, if any, in some embodiments. If the pre-touch illumination mode has not been enabled, the method may proceed to block 712 for detection of capacitive changes at one or more capacitive sensor pads indicating received user input.

The host microprocessor in an embodiment at block 710 may execute machine readable code instructions of a user input capacitive pad sensing illumination orchestration system to set a pre-touch illumination capacitive change threshold value for the touch input mode to trigger illumination of the removable tactile input layer prior to the user making contact with the removable tactile input layer when operating in the touch input mode. Pre-touch illumination may be enabled, such as, for example, by a user via a graphical user interface (GUI) of the user input capacitive pad sensing illumination orchestration system executing via a host microprocessor. In pre-touch illumination mode, the host microprocessor operating in the touchless gesture input mode may determine a transition to either the touch input mode or the key press input mode by execution of machine readable code instructions of the user input capacitive pad sensing illumination orchestration system to determine that a user's finger or hand is hovering and may engage with touch or even a keypress. The time period of hovering over a single spot, the capacitive change level reaching the pre-touch illumination capacitive change threshold value and approaching the minimum user touch input capacitive change threshold values detected by a capacitive pad sensor may be used as a criteria to trigger the pre-touch illumination at that spot or location on the removable tactile input layer. In pre-touch illumination, host processor executing machine readable code instructions of the user input capacitive pad sensing illumination orchestration system may instruct emission of light via the micro or mini LEDs situated within the keyboard sensing hardware structure at the detecting capacitive pad sensor or nearby capacitive pad sensors to indicate a location and that a usage mode transition is to occur prior to the user making contact with a finger or portion of a hand at the removable tactile input layer.

The pre-touch illumination capacitive change threshold value in an embodiment may be, for example, a percentage value of or a set capacitive change value amount less than the touch input mode capacitive change threshold value minimum for transition to the user touch input mode. For example, the host microprocessor in embodiments may execute machine readable code instructions of the user input capacitive pad sensing illumination orchestration system to set a pre-touch illumination capacitive change threshold value for the touch input mode that is a less than the touch input mode capacitive change threshold range but approaching the same. More specifically, if the detected capacitive change level increases to within the percentage capacitance change value of or the set amount of capacitive change value approaching the touch input mode capacitive change threshold minimum, such as ten percent for example, the user input capacitive pad sensing illumination orchestration system then triggers illumination of keys or illumination of a location on the removable tactile input layer indicating the imminent touch as user interactive illumination prior to the user touching the keys in an embodiment.

One or more capacitive sensor pads in an embodiment at block 712 may detect a change in capacitance as a user finger or hand presses a key, touches one or more keys, or touchlessly gestures above the surface of one or more keys. This detected change in capacitance may be detected by grouped plural capacitive sensor pads and received at the regional capacitive and gesture sensing orchestration system, via the capacitive sensor driver and capacitive sensor microprocessor operatively coupling the detecting group of capacitive pad sensor with the host microprocessor in an embodiment. For example, in an embodiment described with respect to FIG. 3, the keyboard sensing hardware structure 362 includes interface detection electronics, such as capacitive sensing pads 341*a* to 341*n*, and operates to capacitively detect user input received on or above the removable tactile input layer 360 installed above the sealed input surface 361 and through which the user may provide input into the information handling system. Execution of code instructions of the regional capacitive and gesture sensing orchestration system, via the host microprocessor, provides for a larger region of capacitive change sensing which may have a larger capacitive field reach as well as reduced latency due to a larger region being able to detect user input movements such as may occur with user touch inputs or touchless gesture inputs. Detection of changes in capacitance at various levels of capacitance change are detected by the capacitive sensor microprocessor 367 and determined by the execution of the capacitive sensor driver 366 as indicative of a user's keypress inputs, a user's touch inputs, or a user's touchless gesture inputs at or near the keyboard keys 395 or other input surfaces of the keyboard structure 356 or the removable tactile input layer 360. These levels may be used to by the regional capacitive and gesture sensing orchestration system, via the capacitive sensor driver and capacitive sensor microprocessor, to determine a usage mode for operation in selecting size of grouped capacitive sensor pads as well as coordination with the user input capacitive pad sensing illumination orchestration system, via the host microprocessor, to coordinate user interactive illumination from LED in an LED illumination layer.

At block 714, it may be determined which user mode is currently active. For example, the host microprocessor in an embodiment executing machine readable code instructions of the regional capacitive and gesture sensing orchestration system may determine whether the received change in capacitance is associated with the key press input mode, the touch input mode, or the touchless gesture input mode. As described herein, a host microprocessor executing machine readable code instructions of a user input capacitive pad sensing illumination orchestration system in an embodiments may provide user interaction illumination as visual feedback depending on detected usage mode for user input received at capacitive sensor pads in the form of light emitting diode (LED) illumination co-located with those capacitive sensor pads in the keyboard sensing hardware structure formed beneath sealed input surface of the base chassis. For example, the color, intensity level, location or movement direction of illumination from LEDs co-located in the keyboard sensing hardware structure specific to the currently detected usage input mode, which may include the key press input mode, the touch input mode, and the touchless gesture input mode, at the location of detected user input at the removable tactile input layer. In an embodiment, a host microprocessor executing machine readable code instructions for a user input capacitive pad sensing illumination orchestration system may determine which of the usage input modes have been engaged and may generate an interactive illumination for that engaged usage input mode such as with an associated a color or range of light intensity for each usage input mode. For example, a key press input mode may be associated with a first general lighting (e.g., a first lighting intensity level or color) of the removable tactile input layer indicating typing status. The touch input mode and touchless gesture input mode may be associated with a second and third lighting settings respectively (e.g., different lighting intensities or colors to indicate which usage mode is engaged) for usage mode status. Further, for user touch inputs or touchless gesture inputs, touch input mode and touchless gesture input mode may be associated with additionally interactive illumination lighting settings respectively indicating visual feedback for motion of touch or touchless gestures, intensity of time of application of a touch or hover, or direction of user touch inputs or touchless gesture inputs as feedback generated by the execution of machine readable code instructions of the user input capacitive pad sensing illumination orchestration system. For example, different lighting intensities, colors, movement, or area coverages to indicate feedback of particular touch inputs or touchless gesture inputs being received when the touch input mode or touchless gesture input mode is engaged.

If the received change in capacitance meets the key press input mode capacitive change threshold value at block 714, the method may proceed to block 716 for illumination of LEDs situated beneath the removable tactile input layer at colors or intensities associated with the key press input mode. If the received change in capacitance meets the touchless gesture input mode capacitive change threshold value at block 714, the method may proceed to block 720 for illumination of LEDs situated beneath the removable tactile input layer at colors or intensities associated with the touchless gesture input mode. If the received change in capacitance meets the user touch input threshold capacitive change values at block 714 for the touch input mode, the method may proceed to block 718 for illumination of LEDs situated beneath the removable tactile input layer at colors or intensities associated with the touch input mode. In this way, execution of machine readable code instructions of the user input capacitive pad sensing illumination orchestration system indicates a status of which usage mode is engaged by visual feedback with the user interactive illumination via the LEDs in the keyboard sensing hardware structure under the sealed input surface of the base chassis.

The host microprocessor operating in the key press input mode in an embodiment at block 716 may execute machine readable code instructions of the user input capacitive pad sensing illumination orchestration system to orchestrate emission of light at a color associated with the key press mode at mini or micro LEDs situated beneath each capacitive pad sensor at which capacitive changes meeting the key press input mode capacitive change threshold value are sensed or across all LEDs illuminating a removable tactile input layer in various embodiments. This may provide visual user feedback across the entire keyboard indicating a general typing status in keypress input mode in embodiments herein. In other embodiments, visual user feedback is provided for particular user key press inputs in the form of illumination as a keypress input is identified at each key in some embodiments.

In some embodiments, host microprocessor operating in the key press input mode may execute machine readable code instructions of the user input capacitive pad sensing illumination orchestration system to orchestrate to determine that the received capacitive change values are no longer meeting the key press input mode capacitive change threshold value and instead are meeting a touch input mode capacitive change threshold value range or even a touchless gesture input mode capacitive change threshold value. In these cases, the host microprocessor operating in the key press input mode may execute machine readable code instructions of the user input capacitive pad sensing illumination orchestration system may provide for a visual user interactive illumination feedback, such as changing lighting color or intensity (e.g., blinking or increasing intensity) to indicate leaving the keypress input mode and general typing function and switching to operation in either the touch input mode or touchless gesture input mode. In this way, the user has user interactive illumination warning of the changes in groupings of capacitive sensor pads and sensitivity of capacitive sensing that may change when the keyboard sensing hardware structure may begin to operate in the touch input mode or touchless gesture input mode.

At block 718, in an embodiment in which the current usage input mode is the touch input mode, the host microprocessor may execute machine readable code instructions to orchestrate emission of light at a color or intensity associated with the touch input mode at mini or micro LEDs situated beneath each capacitive pad sensor at which capacitive changes meeting the touchless input capacitive change threshold value are sensed, to illuminate user touch input as it is identified to provide user feedback illuminating the points along the removable tactile input layer at which user input in the form of user touch has been detected. This may illuminate user touch input during user contact with the removable tactile input layer, or across multiple regions of grouped capacitive sensor pads of the capacitive pads layer operating in the user touch input mode to indicate the user touch input location or direction, or a touch input function, such as an increase or decrease in volume.

In embodiments in which the host microprocessor is operating in the pre-touch illumination mode, the host microprocessor may execute machine readable code instructions of the user input capacitive pad sensing illumination orchestration system to orchestrate emission of light at varying intensity or color for the pre-touch illumination as a capacitive change sensed at one or more capacitive sensor pads moves from the pre-touch illumination threshold value to the touch input mode capacitive change threshold value for the touch input mode, indicating user contact with the removable tactile input layer. In pre-touch illumination mode, the host microprocessor operating in the touchless gesture input mode may determine a transition to either the touch input mode or the key press input mode by execution of machine readable code instructions of the user input capacitive pad sensing illumination orchestration system to determine that a user's finger or hand is hovering and may engage with touch or even a keypress on the removable tactile input layer. In pre-touch illumination, a host processor executing machine readable code instructions of the user input capacitive pad sensing illumination orchestration system may instruct emission of light via the micro or mini LEDs situated within the keyboard sensing hardware structure to indicate a location and that a usage mode transition is to occur prior to the user making contact with a finger or portion of a hand at the removable tactile input layer.

Further, the host microprocessor may execute machine readable code instructions of the user input capacitive pad sensing illumination orchestration system to adjust or move the displayed interactive lighting through the removable tactile input layer and across particular capacitive sensor pads or groupings of capacitive sensor pads in capacitive change detection regions across the capacitive pads layer to indicate location, direction, or detection of touch gestures as touch input in various embodiments. In further embodiments, the host microprocessor may execute machine readable code instructions of the user input capacitive pad sensing illumination orchestration system to adjust or move displayed interactive lighting levels or colors through the removable tactile input layer to indicate transition of an input function to particular IO device functions or to execution of software applications, such as volume or brightness selection, to indicate status of the detection of touch input, such as swipes or other touch gestures, as input to execute those functional inputs in software or firmware on the information handling system.

In still another embodiment at block 720 in which the current usage input mode is the touchless gesture input mode, the host microprocessor may execute machine readable code instructions to orchestrate emission of light at a color or intensity associated with the touchless gesture input mode at mini or micro LEDs situated beneath each capacitive pad sensor at which capacitive changes meeting the touchless gesture input capacitive change threshold value are sensed. This may indicate status of the keyboard sensing hardware structure operating in the touchless gesture detection mode indicating even larger groupings of capacitive pad sensors and sensitivity of the capacitive fields to reach touchless gesture inputs. In some embodiments, the host microprocessor may execute machine readable code instructions of the user input capacitive pad sensing illumination orchestration system to adjust or move display interactive lighting through the removable tactile input layer and across groupings of capacitive sensor pads in capacitive change detection regions across the capacitive pads layer to indicate location, direction, or detection of user touchless gesture inputs as input to the information handling system in an embodiment. In further embodiments, the host microprocessor may execute machine readable code instructions of the user input capacitive pad sensing illumination orchestration system to adjust or move displayed interactive lighting levels or colors through the removable tactile input layer to indicate transition of an input function for IO devices or control of software applications, such as volume or brightness selection, to indicate status of the detection of received touchless gesture inputs to execute function of those IO devices or software on the information handling system.

For example, in embodiments described with reference to FIGS. 4 and 5, the host microprocessor in an embodiment may execute machine readable code instructions of the user input capacitive pad sensing illumination orchestration system to orchestrate emission of light via mini or micro LEDs situated beneath each capacitive pad sensor to provide visual user feedback for user key press input in the form of illumination as it is identified at each key disposed above a given capacitive pad sensor. In other embodiments, the host microprocessor may execute machine readable code instructions to orchestrate emission of light via a side-firing micro or mini LED 577 and through a wave guide layer 578 that refracts the light at an angle upward through the removable tactile input layer 560 to emit light across the entire surface of the removable tactile input layer 560, rather than only at locations where user touch input is actively sensed by one or more capacitive sensor pads. The emission of light via the side-firing micro or mini LED 577 in such an embodiment may include emission of light of a specific color or intensity associated with the current usage input mode, including the key press input mode, the touch input mode, or the touchless gesture input mode, as described herein.

In embodiments in which the host microprocessor is operating in the pre-touch illumination mode, the host microprocessor may instruct light emissions of varying colors and intensities from LEDs situated beneath the capacitive sensor pads according to the imminent transition of usage input mode prior to the user making contact with the removable tactile input layer. For example, in embodiments in which the current usage input mode is the touchless gesture input mode, the host microprocessor may execute machine readable code instructions of the user input capacitive pad sensing illumination orchestration system to orchestrate emission of light at varying intensity or color as a capacitive change sensed at one or more capacitive sensor pads is detected at the pre-touch illumination threshold value and approaching the touch input capacitive change threshold value for indicating to a user that user touch contact with the removable tactile input layer is imminent and where that touch may occur. As a more specific example, if the touchless gesture input mode were associated with the color blue or a high intensity light and the touch input mode were associated with the color red or a relatively lower intensity light, the host microprocessor may execute machine readable code instructions of the user input capacitive pad sensing illumination orchestration system to orchestrate emission of light via mini or micro LEDs that moves from the color blue to the color purple when capacitive change levels reach the pre-touch illumination threshold value. Then when the capacitive change levels detected reach the minimum range touch input mode threshold level, the user input capacitive pad sensing illumination orchestration system transitions the mini or micro LEDs to the color red or from a medium intensity light to the relatively lower intensity light. This may provide visual feedback user interactive illumination that the usage input mode is shifting from the touchless gesture input mode to the touch input mode as the user's finger or hand approaches the removable tactile input layer.

Similarly, the reverse sequence may occur or different colors or light intensities may be assigned to a keypress input mode for usage input mode status indication in embodiments herein. In such a way, the host microprocessor may execute machine readable code instructions of the user input capacitive pad sensing illumination orchestration system to adjustably illuminate capacitive sensing pads beneath a removable tactile input layer as user interactive illumination based upon current usage input mode, user preferences, as well as the operation of user touch inputs, user touchless gesture inputs, or even keypress inputs as detected at the capacitive sensing pads of a split keyboard stack structure to provide visual feedback to a user of a current usage input mode and of the received user input in embodiments herein.

At block 722, the host microprocessor may determine whether a change in usage input mode has occurred. This may be the case if the detected change in capacitance sensed, such as described at block 712, moves above or below a threshold capacitive change for the most recently determined usage input mode. If the usage input mode has not changed, the method may proceed to block 724 to determine whether the information handling system has powered down. If the usage input mode has changed, the method may proceed back to block 714 for determination of an updated user mode. By repeating the loop between blocks 714 and 722 in such a way, the host microprocessor may execute machine readable code instructions of the user input capacitive pad sensing illumination orchestration system to dynamically adjust illuminating capacitive sensing pads beneath a removable tactile input layer based upon current usage input mode and user preferences as user touch or gesture input as detected at the capacitive sensing pads to provide visual feedback to a user of a current usage input mode and received user input.

It may be determined at block 724 whether the information handling system operating the host microprocessor has powered down. If the information handling system has not powered down, the method may proceed back to block 714 for further detection of change in capacitance at one or more capacitive sensor pads as the user engages with the removable tactile input layer in an embodiment. If the information handling system has powered down, the method may then end.

The blocks of the flow diagrams of FIGS. 6 and 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A split keyboard structure of an information handling system having a keyboard sensing hardware structure formed under a sealed input surface comprising:

a hardware processor, a data storage device, and a power management unit (PMU) within a keyboard chassis to provide power to the hardware processor and data storage device;

the keyboard sensing hardware structure including a plurality of capacitive sensor pads in a capacitive pads layer formed under a sealed input surface of the keyboard sensing chassis to detect capacitive changes from user interaction with a removable tactile input layer including a keyboard installed onto the sealed input surface, a grounding layer, and an active shielding layer between the plurality of capacitive sensor pads and the grounding layer;

a host microprocessor to execute machine readable code instructions of a regional capacitive pad gesture sensing orchestration system to receive an initial detected change in capacitance to determine between when a user input is capacitively detected in a first capacitive change level range for a touch input mode and in a second capacitive change level range for a touchless gesture input mode at one of a plurality of capacitive sensor pads operatively coupled to the host microprocessor via one of a plurality of capacitive sensor microprocessors; and the host microprocessor to execute machine readable code instructions to orchestrate emission of light through the removable tactile input layer, via a plurality of light emitting diodes (LEDs) coplanar with the capacitive pads layer, to indicate a first interactive illumination feedback for user touch inputs capacitively detected in a touch input mode and a second interactive illumination feedback for user touchless gesture inputs capacitively detected in a touchless gesture input mode.

2. The split keyboard structure of the information handling system of claim 1, wherein the first interactive illumination feedback provides illuminated movement guidance with illumination movement across plural LEDs co-located at plural capacitive sensor pads that detect a first user touch input and following the first user touch input on the removable tactile input layer.

3. The split keyboard structure of the information handling system of claim 1, wherein the second interactive illumination feedback provides movement guidance with illumination movement across plural LEDs at plural capacitive sensor pads following a first user touchless gesture input above the removable tactile input layer detected at those plural capacitive sensor pads.

4. The split keyboard structure of the information handling system of claim 1 further comprising:

the host microprocessor to execute machine readable code instructions to emit light at each of the plurality of LEDs coplanar with the plurality of capacitive sensor pads to provide a third interactive illumination feedback when capacitive changes meeting a pre-touch illumination capacitive change threshold level for the touch input mode are sensed to indicate a location for a user touch input before a user touches the removable tactile input layer, where the pre-touch illumination capacitive change threshold level indicates a capacitive change level below and approaching the first capacitive change level range for the touch input mode.

5. The split keyboard structure of the information handling system of claim 4, wherein the host microprocessor executes machine readable code instructions to increase intensity of light emitted at the plurality of LEDs at increasing brightness according to the third illumination feedback based on a magnitude of sensed capacitive change level approaching the first capacitive change level range for the touch input mode as a finger of the user approaches the removable tactile input layer.

6. The split keyboard structure of the information handling system of claim 4, wherein the host microprocessor executes machine readable code instructions to transition a color of light from a first color indicating the touchless gesture input to a second color indicating the pre-touch illumination mode, and to a third color indicating the touch input mode for the light emitted at the plurality of LEDs according to the third illumination feedback based on a magnitude of sensed capacitive change level approaching the first capacitive change level range for the touch input mode as a finger of the user approaches the removable tactile input layer.

7. The split keyboard structure of the information handling system of claim 1, wherein a first user touch input includes the user drawing with a finger across a plurality of keys of the keyboard on the removable tactile input layer and the first interactive illumination feedback for the first user touch input illuminates those keys touched and those ahead of the touched keys as the finger moves across the plurality of keys of the keyboard to indicate direction visual feedback of the first user touch input.

8. The split keyboard structure of the information handling system of claim 1, wherein a first touchless gesture input includes the user's hand or finger gesturing above and across a plurality of keys of the keyboard on the removable tactile input layer and the second interactive illumination feedback for the first touchless gesture input illuminates those keys under the user's hand or finger as the user's hand or finger gestures above and across the plurality of keys of the keyboard to indicate direction visual feedback of the first touchless gesture input.

9. The split keyboard structure of the information handling system of claim 1, wherein a first user touch input includes the user drawing with a finger across a surface on the removable tactile input layer and the first interactive illumination feedback for the first user touch input illuminates at a color or intensity to indicate computing function control over an input/output device, software, or firmware as the finger moves across the surface of the removable tactile input layer to indicate functional input visual feedback of the first touch input.

10. The split keyboard structure of the information handling system of claim 1, wherein a first touchless gesture input includes the user's hand or finger gesturing above and across the removable tactile input layer and the second interactive illumination feedback for the first touchless gesture input illuminates at a color or intensity to indicate computing function control over an input/output device, software, or firmware as the user's hand or finger gestures above and across the removable tactile input layer to indicate functional input visual feedback of the first touchless gesture input.

11. A split keyboard structure of an information handling system having a keyboard sensing hardware structure formed under a sealed input surface comprising:

a hardware processor, a data storage device, and a power management unit (PMU) within a keyboard chassis to provide power to the hardware processor and data storage device;

a capacitive sensing microprocessor operatively coupled to the keyboard sensing hardware structure that includes a plurality of capacitive sensor pads having a capacitive sensing field formed in a capacitive pads layer formed under a sealed input surface of the keyboard sensing chassis to detect capacitive changes from user interaction on or above a removable tactile input layer installed onto the sealed input surface and in the capacitive sensing field of at least one capacitive sensor pad;

the keyboard sensing hardware structure including a grounding layer and an active shielding layer between the plurality of capacitive sensor pads and the grounding layer;

a host microprocessor to execute machine readable code instructions of a regional capacitive pad gesture sensing orchestration system to receive an initial detected capacitive change level from a first user interaction in the capacitive sensing field to determine between when a user input is capacitively detected in a first capacitive change level range for a touch input mode and in a second capacitive change level range for a touchless gesture input mode at one of a plurality of capacitive sensor pads; and the host microprocessor to execute machine readable code instructions to orchestrate emission of light through the removable tactile input layer, via a plurality of light emitting diodes (LEDs) coplanar with the capacitive pads layer, to indicate a first interactive illumination feedback for user touch inputs capacitively detected in a touch input mode and a second interactive illumination feedback for user touchless gesture inputs capacitively detected in a touchless gesture input mode.

12. The split keyboard structure of the information handling system of claim 11, wherein the first interactive illumination feedback includes a first color or light intensity to indicate the capacitive pads layer is operating in the touch input mode when the detected capacitive change level for the user interaction falls within the first capacitive change level range and the second interactive illumination feedback includes a second color or light intensity to indicate the capacitive pads layer is operating in the touchless gesture input mode when the detected capacitive change level for the user interaction falls within the second capacitive change level range.

13. The split keyboard structure of the information handling system of claim 11, wherein the second interactive illumination feedback for user touchless gesture inputs capacitively detected in a touchless gesture input mode includes varying a light intensity to indicate a distance of a user's hand or finger for touchless gesture inputs from the capacitive pads layer to indicate strength of detection of the touchless gesture inputs by the capacitive pads layer.

14. The split keyboard structure of the information handling system of claim 11 further comprising:

the host microprocessor to execute machine readable code instructions to group capacitive sensor pads into subgroups of capacitive sensor pads used to detect the capacitive change values for the user interaction of the user touch inputs in the touch input mode across the capacitive sensing field for capacitive change regions across the capacitive pads layer extending through the removable tactile input layer installed above the sealed input surface of the keyboard chassis; and the host microprocessor to execute machine readable code instructions to orchestrate the emission of light through the removable tactile input layer, via the plurality of LEDs, at the first interactive illumination feedback comprising a first color or light intensity to indicate that the capacitive pads layer is operating in the touch input mode sensing the user interaction via the capacitive pad change regions.

15. The split keyboard structure of the information handling system of claim 11 further comprising:

the host microprocessor to execute machine readable code instructions to emit light at the plurality of LEDs coplanar with the plurality of capacitive sensor pads to provide a third interactive illumination feedback indicating a keypress input mode for user keypress actuation inputs on the keyboard of the removable tactile input layer when the capacitively detected user interaction falls within a third capacitive change level range for the keypress input mode that is above the first capacitive change level range for the touch input mode.

16. The split keyboard structure of the information handling system of claim 11 further comprising:

the host microprocessor to execute machine readable code instructions to emit light at the plurality of LEDs coplanar with the plurality of capacitive sensor pads such that the first interactive illumination feedback provides illuminated movement guidance with illumination movement across plural LEDs co-located at plural capacitive sensor pads that detect a first user touch input and following the first user touch input on the removable tactile input layer; and the host microprocessor to execute machine readable code instructions to emit light at the plurality of LEDs coplanar with the plurality of capacitive sensor pads such that the second interactive illumination feedback provides illuminated movement guidance with illumination movement across plural LEDs co-located at plural capacitive sensor pads that detect a first user touchless gesture input above a removable tactile input layer and following the first user touchless gesture input above the removable tactile input layer.

17. A split keyboard structure of an information handling system having a keyboard sensing hardware structure formed under a sealed input surface comprising:

a hardware processor, a data storage device, and a power management unit (PMU) within a keyboard chassis to provide power to the hardware processor and data storage device;

a capacitive sensing microprocessor operatively coupled to the keyboard sensing hardware structure that includes a plurality of capacitive sensor pads having a capacitive sensing field formed in a capacitive pads layer formed under a sealed input surface of the keyboard sensing chassis to detect capacitive changes from user interaction on or above a removable tactile input layer installed onto the sealed input surface and in the capacitive sensing field of at least one capacitive sensor pad;

the keyboard sensing hardware structure including a grounding layer and an active shielding layer between the plurality of capacitive sensor pads and the grounding layer;

a host microprocessor to execute machine readable code instructions of a regional capacitive pad gesture sensing orchestration system to receive an initial detected capacitive change level from a first user interaction in the capacitive sensing field to determine between when a user input is capacitively detected in a first capacitive change level range for a touch input mode and in a second capacitive change level range for a touchless gesture input mode at one of a plurality of capacitive sensor pads; and the host microprocessor to execute machine readable code instructions to orchestrate emission of light through the removable tactile input layer, via a plurality of light emitting diodes (LEDs) co-located at the capacitive pads layer, to provide a first interactive illumination feedback indicating user touch inputs are capacitively detected with the keyboard sensing hardware structure operating in a touch input mode, and to provide a second interactive illumination feedback indicating user touchless gesture inputs are capacitively detected with the keyboard sensing hardware structure operating in a touchless gesture input mode.

18. The split keyboard structure of the information handling system of claim 17 further comprising:

the host microprocessor to execute machine readable code instructions to orchestrate emission of light through the removable tactile input layer, via the plurality of LEDs co-located at the capacitive pads layer, to provide a third interactive illumination feedback indicating user keypress inputs are capacitively detected with the keyboard sensing hardware structure operating in a keypress input mode to serially scan some portion of the capacitive pad sensors for capacitive change levels of keypress actuations of keys on a keyboard in the removable tactile input layer.

19. The split keyboard structure of the information handling system of claim 17 further comprising:

the removable tactile input layer to include a keyboard with a plurality of keys aligned over the plurality of capacitive sensor pads having co-located LEDs; and the host microprocessor to execute machine readable code instructions to emit light at the plurality of LEDs co-located with the plurality of capacitive sensor pads such that the first interactive illumination feedback provides illuminated movement guidance with illumination movement across plural LEDs co-located at plural capacitive sensor pads that detect a first user touch input and the illumination movement follows the first user touch input across the plurality of keys on the removable tactile input layer.

20. The split keyboard structure of the information handling system of claim 17 further comprising:

the removable tactile input layer to include a keyboard with a plurality of keys aligned over the plurality of capacitive sensor pads having co-located LEDs; and the host microprocessor to execute machine readable code instructions to emit light at the plurality of LEDs co-located with the plurality of capacitive sensor pads such that the second interactive illumination feedback provides illuminated movement guidance with illumination movement across plural LEDs co-located at plural capacitive sensor pads that detect a first touchless gesture input over the plurality of keys and the illumination movement follows the first touchless gesture input on the plurality of keys on the removable tactile input layer under the first touchless gesture input.

* * * * *